United States Patent [19]

Asano

[11] Patent Number: 5,761,399
[45] Date of Patent: Jun. 2, 1998

[54] FACSIMILE SYSTEM AND METHOD FOR CONTROLLING FACSIMILE SYSTEM

[75] Inventor: Yuji Asano, Nagoya, Japan

[73] Assignee: Brother Kogyo Kabushiki Kaisha, Aichi-ken, Japan

[21] Appl. No.: 626,763

[22] Filed: Mar. 29, 1996

[30] Foreign Application Priority Data

Mar. 29, 1995 [JP] Japan .................... 7-071825

[51] Int. Cl.$^6$ .................................... H04N 1/32
[52] U.S. Cl. ............... 395/114; 358/435; 358/442; 358/468
[58] Field of Search ............... 358/400, 434–442, 358/468; 395/109, 113, 114, 200.08; 379/100, 100.05; 399/82–83, 87, 85; H04N 1/00, 1/32

[56] References Cited

U.S. PATENT DOCUMENTS

| | | | |
|---|---|---|---|
| 5,428,458 | 6/1995 | Aiba et al. | 358/468 |
| 5,574,834 | 11/1996 | Horie et al. | 395/114 |
| 5,592,307 | 1/1997 | Murai | 358/468 |
| 5,669,040 | 9/1997 | Hisatake . | |

*Primary Examiner*—Kim Vu
*Attorney, Agent, or Firm*—Kane, Dalsimer, Sullivan, Kurucz, Levy, Eisele, and Richard, LLP

[57] ABSTRACT

A request command is transmitted from a computing device to a facsimile device to request function list data of the facsimile device, representing adjustable functions, possible function settings, and/or current function settings of the facsimile device. The facsimile device receives the request command and responds by sending a description of its functions, corresponding possible function settings, and/or current function settings as function list data to the computing device. The function list data and settings are displayed at the computing device when a remote setup routine is executed, and a user can identify the functions and function setting options of the connected facsimile, and set function settings by an input device. The computing device sends the desired function settings to the facsimile device, and the facsimile device changes its function settings according to those received.

34 Claims, 12 Drawing Sheets

FACSIMILE SYSTEM AND METHOD FOR CONTROLLING FACSIMILE SYSTEM

BACKGROUND OF THE INVENTION

The present invention relates to a facsimile system and a method for controlling the facsimile system, and particularly to a method of setting function options of the facsimile device.

Conventional facsimile devices have various types of functions depending on the purpose of use for the device, the number of telephone lines, etc. In order to transmit facsimile data to and from a computer system, both facsimile devices built into the computer system or independent facsimile devices connectable to the computer system may input and output the facsimile data, with or without printing.

When the facsimile device (having various functions) and the computer system are capable of exchanging data, functions of the facsimile device and function selections may be displayed and selected at the computer system. With this method, the function settings of a built-in facsimile device or a connected independent facsimile device are settable. The setting is easily accomplished in comparison to the direct setting on the facsimile device, as a facsimile device is usually provided with a simple control panel having only a few keys and a small, simple display.

However, as explained above, many types of facsimile devices having various functions exist, and it has been necessary to make a separate function controlling program for each respective device. Conventional facsimile system control systems cannot discern the functions of a connected facsimile device.

While it may be possible to make a single function setting data program for various types of facsimile devices by introducing all the types of function list data being employed in every type of available device into the program, the amount of function setting data and number of setting options becomes enormous. Further, in such an omnibus function setting data program, function settings having no relation with the particular connected facsimile device, or those which cannot be set for that particular device, are displayed in the function setting data menu. This type of omnibus function setting data program results in confusing patterns of use, function setting data conflicts, and an overlarge function setting data program.

SUMMARY OF THE INVENTION

It is therefore an object of the present invention to provide facsimile system and method for controlling a facsimile system capable of allowing a computing device to remotely set function settings of a facsimile device according to new information requested and received from the facsimile machine.

In order to meet the objects of the invention, a method for controlling a facsimile system includes the steps of: connecting a computing device and a facsimile device, the facsimile device being responsive to received request commands and received function settings; transmitting a request command from the computing device to the facsimile device to request a list of adjustable functions having corresponding function settings, the list being resident in the facsimile device; transmitting the list of adjustable functions and corresponding function settings from the facsimile device to the computing device; selecting a setting of one of the adjustable functions from the corresponding function settings at the computing device; transmitting the selected function setting of the adjustable function from the computing device to the facsimile device; and adjusting the adjustable function according to the selected function setting at the facsimile device.

In this manner, the computing device, having no information about the connected facsimile device, can query the facsimile device and receive a list of functions, possible function settings, and current settings from the facsimile device, whereupon a user operating the computing device can select a setting from the possible function settings of a particular function or functions, and remotely set the functions the facsimile device from the computing device. Since the computing device is able to receive any list of functions and settings, the computing device can control any connected facsimile machine.

According to one development of the invention, the computing device including a non-volatile memory, and the method further includes a step of: executing an installation routine in the computing device to install a facsimile processing program in the non-volatile memory of the computing device, wherein the transmitting a request command is performed in association with the executing of the installation routine. For example, the non-volatile memory includes a hard disk drive.

Accordingly, the function list and/or corresponding settings are received at the computing device when the facsimile processing program in first installed, and even when the user executes the facsimile processing program for the first time, the list and settings can be quickly recalled from the non-volatile memory device without issuing a request command to the facsimile device.

In another development of the invention, the method includes a step of: executing a facsimile processing program for transmitting and receiving facsimile data to the facsimile device at the computing device, wherein the transmitting of a request command is performed in association with the executing of the facsimile processing program. In this manner, the function list and/or function settings are requested and received when the user executes facsimile processing, maintaining current values and keeping only the appropriate functions and settings.

In still another development of the invention, the method includes steps of: checking a received transmission at the facsimile device; and enabling the transmitting of the list of adjustable functions and corresponding function settings only when the received transmission includes the request command.

Consequently, the facsimile device is able to distinguish between request commands and other types of received data, and to respond according to the type of received data. Furthermore, the facsimile device is able to recognize a request command for a function list and/or corresponding settings. In a further development, a step of enabling the adjusting the adjustable function according to the selected function setting only when the received transmission includes the selected function setting is added to the method. The facsimile device is then able to recognize and respond to received function settings and to respond by adjusting the resident settings.

According to one aspect of the invention, the computing device includes a non-volatile memory, a processing memory, a display, and an input device, and the method further including steps of: storing the list of adjustable functions and corresponding function settings to the non-volatile memory; recalling the list of adjustable functions and corresponding function settings from the non-volatile memory to the processing memory; displaying the recalled list of the adjustable functions and corresponding function settings at the computing device; and accepting input from the input device, the input determining the selecting of a setting of one of the adjustable functions.

In this manner, the user can easily adjust the function settings of the facsimile device at the computing device. Furthermore, the data can be stored, edited, and-recalled locally, enabling rapid and convenient remote adjustment of the function settings of the facsimile device.

In a particularly favorable development of this aspect of the invention, the method preferably further includes the steps of: storing the selected function setting of the adjustable function to the non-volatile memory; recalling the selected function getting of the adjustable function from the non-volatile memory to the processing memory; and displaying the selected function setting of the adjustable function at the computing device.

Accordingly, the function settings themselves can be stored, edited, and recalled without requesting the function list from the facsimile device, without changing the function settings in the facsimile device, and without storing or recalling the function list from the non-volatile memory. This enables efficient setting of the function settings, and furthermore, allows the user to save different function setting data sets for different situations to be easily recalled and sent to the facsimile device.

In another particularly favorable development of this aspect of the invention, the method includes transmitting a request command from the computing device to the facsimile device to request a new list of function settings corresponding to the list of adjustable functions recalled to the processing memory; transmitting the new list of function settings from the facsimile device to the computing device; and updating the list of the function settings recalled to the non-volatile memory according to the new list of function settings at the computing device.

In this manner, the function settings themselves can be requested and updated without requesting the function list from the facsimile device, without changing the function settings in the facsimile device, and without storing or recalling the function list from the non-volatile memory. This enables efficient setting of the function settings, and furthermore, allows the user to easily update the current status of the facsimile device function settings.

In a preferred embodiment according to this aspect of the invention, displaying the recalled list includes steps of: building a menu of adjustable functions and corresponding function settings from the recalled list; and displaying the menu on the display. A menu display is particularly suited for easy selection of function settings.

In a particular embodiment, the facsimile device includes: a printer unit for printing images, the printer unit having a printing apparatus and an input/output interface; and a facsimile unit for sending and receiving facsimile image transmissions, the list of adjustable functions having corresponding function settings being resident in the facsimile unit, and the facsimile unit being responsive to received request commands and received function settings; and a gate array connecting the printer unit and the facsimile unit, wherein the computing device is connected to the input/output interface, and all request commands, function settings, and lists of adjustable functions and function settings are transmitted between the computing device and the facsimile unit through the input/output interface, the printer unit, and the gate array.

According to another aspect of the invention, a facsimile system, having a computing device and a facsimile device, includes: connecting means for connecting the computing device and the facsimile device to exchange transmissions; list storing means in the facsimile device for storing a list of adjustable functions and corresponding function settings of the facsimile device; request command transmitting means in the computing device for transmitting a request command to the facsimile device to request the list of adjustable functions and corresponding function settings; list transmitting means in the facsimile device for transmitting the list of adjustable functions and corresponding function settings to the computing device in response to the request command; function setting selecting means in the computing device for selecting a function setting of one of the adjustable functions from the corresponding function settings; selected function setting transmitting means in the computing device for transmitting a selected function setting of the adjustable function to the facsimile device; function adjusting means in the facsimile device for adjusting an adjustable function of the facsimile device in response to the selected function setting.

In this manner, the computing device, having no information about the connected facsimile device, can query the facsimile device and receive a list of functions, possible function settings, and current settings from the facsimile device, whereupon a user operating the computing device can select a setting from the possible function settings of a particular function or functions, and remotely set the functions the facsimile device from the computing device. Since the computing device is able to receive any list of functions and settings, the computing device can control any connected facsimile machine.

According to one development of this aspect of the invention, the facsimile system further includes: a non-volatile memory in the computing device; and installation routine executing means in the computing device for executing an installation routine to install a facsimile processing program in the non-volatile memory of the computing device, wherein the request command is transmitted by the installation routine executing means. For example, the non-volatile memory includes a hard disk drive.

Accordingly, the function list and/or corresponding settings are received at the computing device when the facsimile processing program is first installed, and even when the user executes the facsimile processing program for the first time, the list and settings can be quickly recalled from the non-volatile memory device without issuing a request command to the facsimile device.

In another development of this aspect of the invention, the facsimile system further includes: facsimile processing program executing means in the computing device for executing a facsimile processing program for transmitting and receiving facsimile data to the facsimile device, wherein the request command is transmitting by the facsimile processing program executing means. In this manner, the function list and/or function settings are requested and received when the user executes facsimile processing, maintaining current values and keeping only the appropriate functions and settings.

In still another development of this aspect of the invention, the facsimile system further includes: received transmission checking means in the facsimile device for checking a received transmission; and list transmitting enabling means in the facsimile device for enabling list transmitting means only when the received transmission includes the request command.

Consequently, the facsimile device is able to distinguish between request commands and other types of received data, and to respond according to the type of received data. Furthermore, the facsimile device is able to recognize a request command for a function list and/or corresponding settings. In a further development, function adjusting enabling means is added in the facsimile device for enabling the function adjusting means only when the received transmission includes the selected function setting.

According to still another aspect of the invention, the facsimile system further includes: a non-volatile memory in the computing device; a processing memory in the computing device; a display in the computing device; an input device in the computing device; means for storing the list of adjustable functions and corresponding function settings to the non-volatile memory; means for recalling the list of adjustable functions and corresponding function settings from the non-volatile memory to the processing memory; means for displaying the recalled list of the adjustable functions and corresponding function settings on the display; and means for accepting input from the input device, the input determining the selection of the function setting by the function setting selecting means.

In this scanner, the user can easily adjust the function settings of the facsimile device at the computing device. Furthermore, the data can be stored, edited, and recalled locally, enabling rapid and convenient remote adjustment of the function settings of the facsimile device.

In a particularly favorable development of this aspect of the invention, the facsimile system further includes: means for storing the selected function setting of the adjustable function to the non-volatile memory; means for recalling the selected function setting of the adjustable function from the non-volatile memory to the processing memory; and means for displaying the selected function setting of the adjustable function on the display.

Accordingly, the function settings themselves can be stored, edited, and recalled without requesting the function list from the facsimile device, without changing the function settings in the facsimile device, and without storing or recalling the function list from the non-volatile memory. This enables efficient setting of the function settings, and furthermore, allows the user to save different function setting data sets for different situations to be easily recalled and sent to the facsimile device.

In another particularly favorable development of this aspect of the invention, the facsimile system further includes: function setting request transmitting means in the computing device for transmitting a request command to the facsimile device to request a new list of function settings corresponding to the list of adjustable functions recalled to the processing memory; new list transmitting means in the facsimile device for transmitting the new list of function settings to the computing device; and list updating means in the computing device for updating the list of the function settings recalled to the non-volatile memory according to the new list of function settings.

In this manner, the function settings themselves can be requested and updated without requesting the function list from the facsimile device, without changing the function settings in the facsimile device, and without storing or recalling the function list from the non-volatile memory. This enables efficient setting of the function settings, and furthermore, allows the user to easily update the current status of the facsimile device function settings.

In a preferred embodiment according to this aspect of the invention, the means for displaying the recalled list of the adjustable functions and corresponding function settings includes: means for building a menu of adjustable functions and corresponding function settings from the recalled list; and means for displaying the menu on the display. A menu display is particularly suited for easy selection of function settings.

According to yet still another aspect of the invention, in a facsimile system including a computing device and a facsimile device, the facsimile system includes: connecting means for connecting the computing device and the facsimile device to exchange transmissions; function list storing means in the computing device for storing a plurality of lists of adjustable functions and corresponding function settings; function list data storing means in the facsimile device for storing function list data representative of one of the plurality of lists; request command transmitting means in the computing device for transmitting a request command to the facsimile device to request the function list data; function list data transmitting means in the facsimile device for transmitting the function list data to the computing device in response to the request command; function setting selecting memory in the computing device for selecting a function setting of one of the adjustable functions from the corresponding function settings according to the function list data representative of the one of the lists; selected function setting transmitting means in the computing device for transmitting a selected function setting of the adjustable function to the facsimile device; function adjusting means in the facsimile device for adjusting an adjustable function of the facsimile device in response to the selected function setting.

In this manner, the computing device, having no information about the connected facsimile device but having stored a plurality of lists of functions describing numerous facsimile devices, can query the facsimile device and receive function list data (to identify which list is representative of the connected facsimile device) and current settings from the facsimile device, whereupon a user operating the computing device can select a setting from the possible function settings of a particular function or functions, and remotely set the functions the facsimile device from the computing device. Since the computing device is able to receive any function list data representing one of the lists in the plurality of lists stored therein, the computing device can control any connected facsimile device able to send function list data.

According to a further aspect of the invention, a facsimile device includes: an input/output interface for receiving and transmitting control data; list storing means for storing a list of adjustable functions and corresponding function settings of the facsimile device; request command receiving means for receiving control data representing a request command through the input/output interface; list transmitting means for transmitting the list of adjustable functions and corresponding function settings in response to the control data representing a request command; selected function setting receiving means for receiving control data representing a selected function setting of the adjustable function through the input/output interface; and function adjusting means for adjusting an adjustable function of the facsimile device in response to the control data representing a selected function setting.

In this manner, the facsimile device can transmit a list of functions, possible function settings, and current settings through the input/output interface, whereupon a user operating a computing device attached to the input/output interface can select a setting from the possible function settings of a particular function or functions, and remotely set the functions the facsimile device through the input/output interface. Since the facsimile device is able to send only a list of its own particular functions and settings through the input/output interface, the facsimile device is able to determine the controllable settings for any computing device connected through the input/output interface.

According to a still further aspect of the invention, a facsimile device controller for controlling a facsimile device includes: an input/output interface for receiving and transmitting control data; request command transmitting means for transmitting control data representing a request command to request a list of adjustable facsimile device functions and corresponding facsimile device function settings through the input/output interface; list receiving means for receiving the list of adjustable facsimile device functions and corresponding facsimile device function settings; function setting selecting means for selecting a function setting of one of the adjustable facsimile device functions from the corresponding facsimile device function settings; and selected function setting transmitting means for transmitting control data representing a selected facsimile device function setting of the adjustable facsimile device function through the input/output interface.

Consequently, the computing device, having no information about a connected facsimile device, can send a query through the input/output interface and receive a list of functions, possible function settings, and current settings through the input/output interface, whereupon a user operating the computing device can select a setting from the possible function settings of a particular function or functions, and remotely set the functions of the facsimile device through the input/output interface. Since the computing device is able to receive any list of functions and settings through the input/output interface, the computing device can control any connected facsimile machine.

DETAILED DESCRIPTION OF THE PREFERRED EMBODIMENTS

Figure 1:
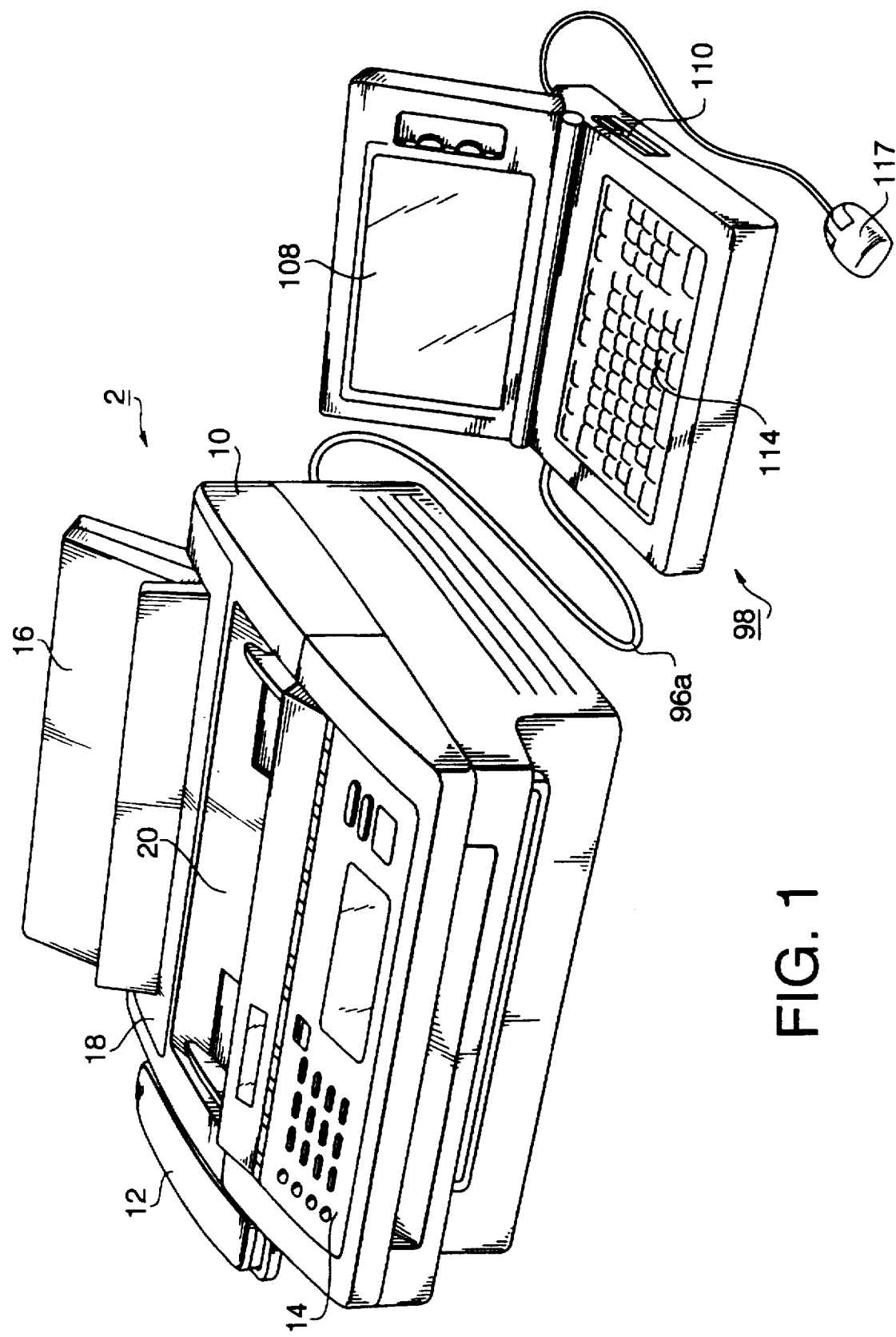
FIG. 1 is a perspective view showing the external appearance of a facsimile system according to the invention, including a connected computing device and facsimile device.
Figure 2:
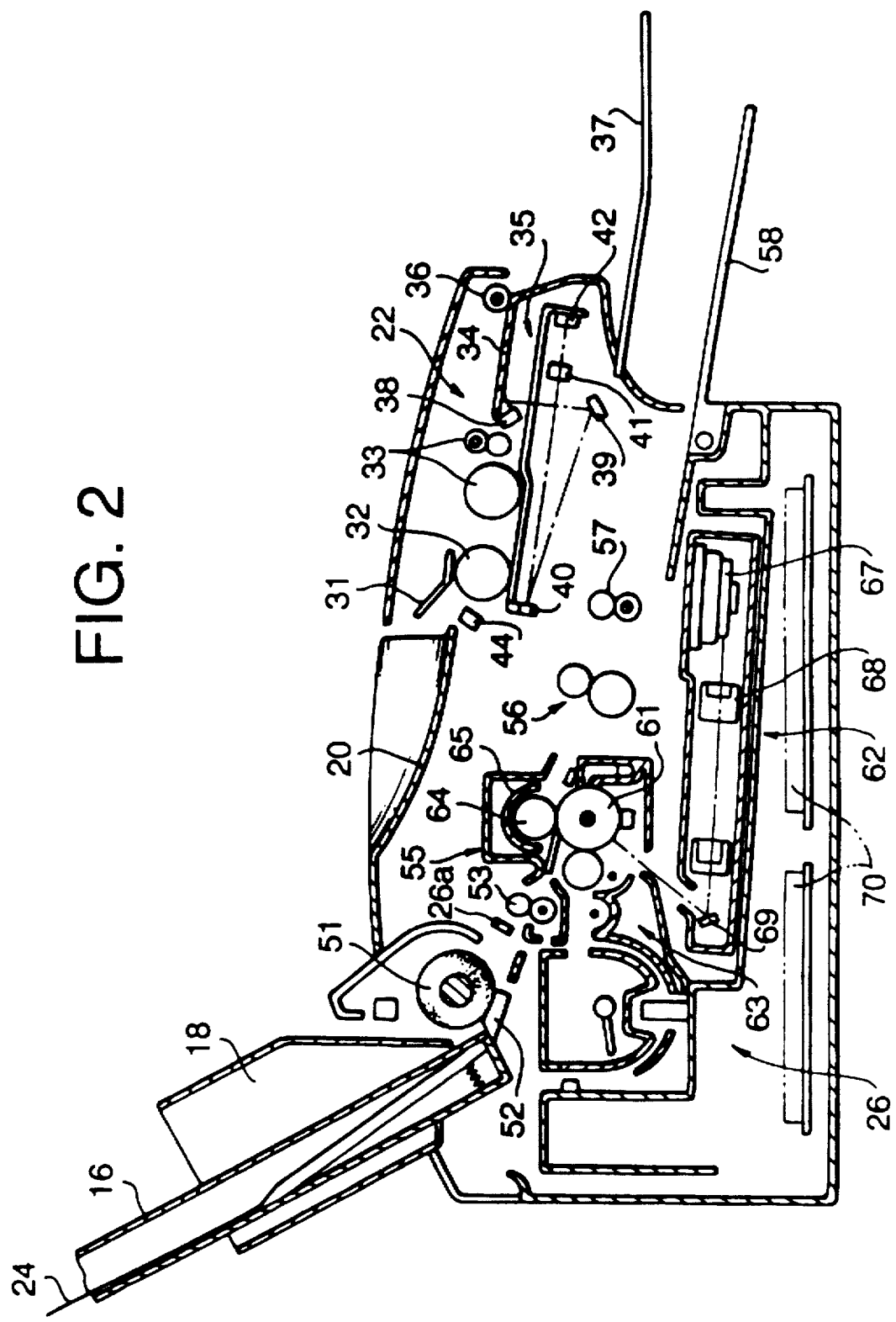
FIG. 2 an explanatory view showing the internal construction of the facsimile device according to the invention.
Figure 3:
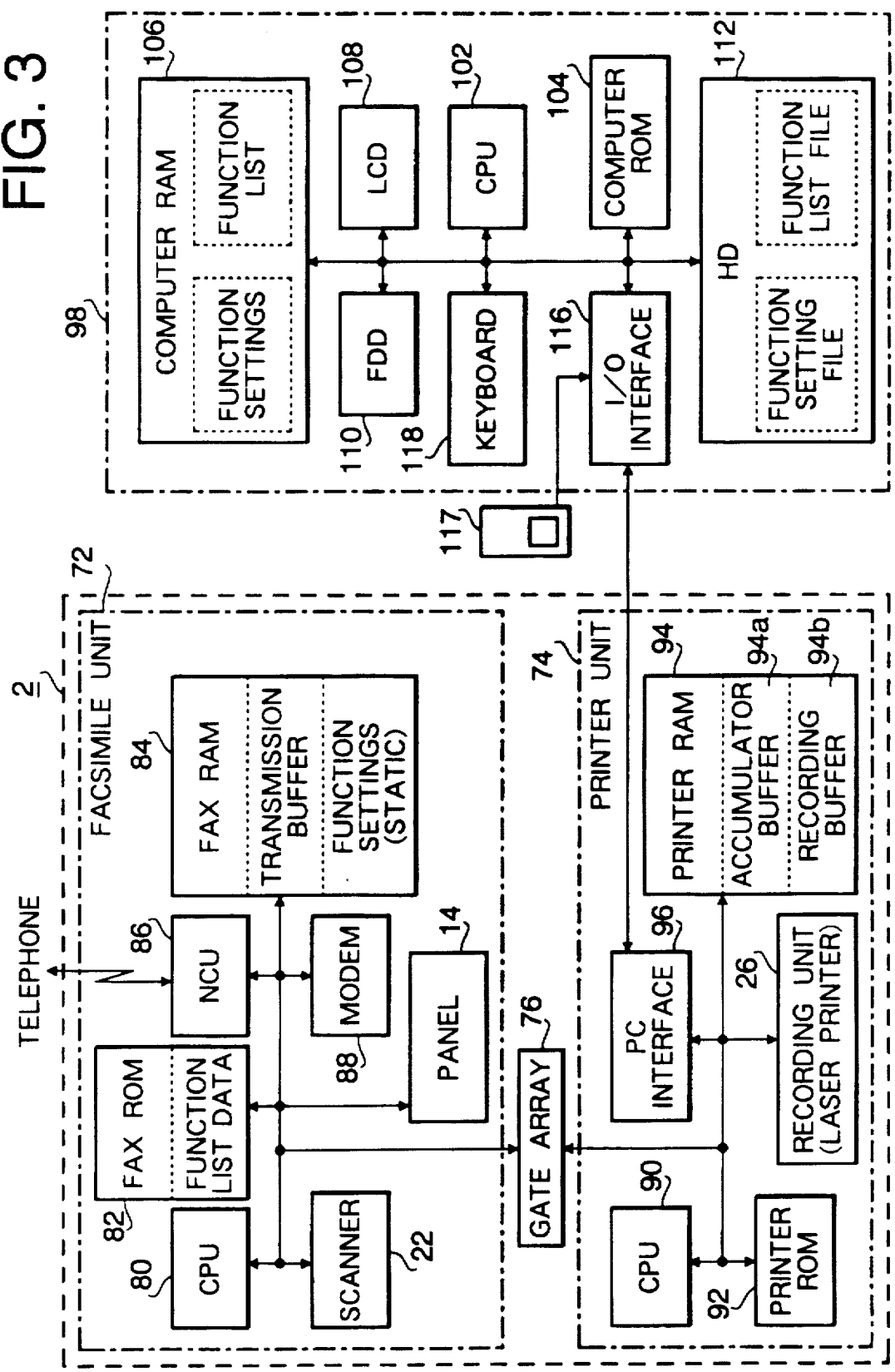
FIG. 3 is a block diagram showing the control and interface systems of a first embodiment of a facsimile system according to the present invention.

FIG. 1 is a perspective view showing the external appearance of a system according to the invention including a facsimile device 2 connected to a computing device, in this case a personal computer 98; FIG. 2 is an explanatory view showing the internal construction of the facsimile device 2; and FIG. 3 is a block diagram showing the control and interface systems of the facsimile device 2 and personal computer 98.

The facsimile device 2 has two functions. Firstly, a facsimile function, for reading an image from an original to produce image data, and transmitting the image data to another facsimile device as facsimile data by telephone; and for receiving facsimile data by telephone and forming an image on recording paper in accordance with the received data. Secondly, a printer function for receiving print data from a personal computer, word processor or the like (hereinafter generically referred to as a personal computer) through a printer cable, and forming an image on recording paper in accordance with the received printer data. Furthermore, the facsimile device 2 of this embodiment sends function information and request command data of the facsimile device 2 to the personal computer 98 in response. Still furthermore, in response to the function setting data transmitted from the personal computer 98, the setting of function setting data options of the facsimile device 2 is carried out.

As shown in FIG. 1, a handset 12 is mounted on a side wall of the body 10 of the facsimile device, and an operation panel 14 is provided on the top of the facsimile device 2. A cassette receptor 18 behind the operation panel 14, is formed where a sheet cassette 16 (shown in FIG. 2) is detachably attached. An original document tray 20 is provided at the center of the top surface of the facsimile device 2.

As shown in FIG. 2, a scanner unit 22 for reading an image on an original mounted on the original document tray 20, an image forming unit 26 for forming an image on a recording sheet 24, and a control unit 70 for driving each unit to function, are provided inside the body 10 of the facsimile device 2.

At the scanner unit 22, original documents placed on the original document tray 20 are fed sequentially into the scanner unit 22 by means of a feeding mechanism including feed rollers 33, a sheet separating pad 31, a sheet separating roller 32, and an original document sensor 44. The original document sensor 44 detects whether original documents are placed on the original document tray 20 along a sheet traveling path from the original document tray 20 to the sheet feed mechanism. The introduced originals are separated by the sheet separating roller 32 and sheet separating pad 31, and are fed by the feed rollers 33, to the original support plate 34. The image on the original is read by an image reading unit 35 provided below the original support plate 34. After the image on the original is read, the original is discharged by the discharge roller 36 and is stacked on a discharged sheet tray 37.

The image reading unit 35 has a light source 38, mirrors 39 and 40, a lens 41, and a line image sensor 42. The surface of the original is illuminated by the light source 38. Light reflected by the surface of the original is then reflected by the mirrors 39 and 40, and focused by the lens 41 on the light receiving surface of the line image sensor 42. Line image scanning for facsimile image data in the manner of the image reading unit 35 are well known.

At the image forming unit 26, recording sheets accommodated in the recording sheet cassette 16 are sequentially fed by a feed roller 51 and a sheet separation pad 52. Each recording sheet 24 introduced in the image forming unit 26 is fed to the image forming device 55 by a further feed roller 53. A toner image is formed on the recording sheet 24 by the image forming device 55.

A recording sheet 24 bearing an unfixed toner image is then fed to the fixing device 56, where the toner image is fixed onto the recording sheet 24. After the toner image is fixed, the recording sheet 24 is discharged by means of a discharge roller 57, and stacked on a discharged sheet tray 58 provided in front of the body 10.

The fixing device 56 has a heat roller having a built-in heater, and a support roller. The recording sheet 24 is nipped between the heat roller and the support roller, and heat and pressure are applied to fix the toner image. That is, the fixing device 56 is a well known plain-paper fixing unit.

The image forming device 55 has a photoconductive drum 61, a laser scanning device 62 for emitting a scanning laser beam to form a latent image on the surface of the photoconductive drum 61, a developing device 63 for applying toner to the latent image to form a toner image, a transfer device 65 having a transfer roller 64 for transfer the toner image on the recording sheet 24 by charging the recording sheet 24. The laser scanning device 62 has a laser emitting unit 67 which emits laser beam under control of the control unit 70, a lens 68 for converging the laser beam, and a mirror 69 for directing the laser beam converged by the lens 68 towards the photoconductive drum 69. That is, the image forming unit 26 is a laser printer. and according to the instructions from the control unit 70, forms an image on the recording sheet 24.

During image formation, the leading edge of the recording sheet 24 is detected by a recording sheet leading edge sensor 26a, upon the detection of which the image transfer timing for the image transfer device 65 is determined.

FIG. 3 is a block diagram of the control unit 70 of the facsimile device 2. The control unit 70 has a facsimile unit 72, a printer unit 74, and a gate array 76 connecting the facsimile unit 72 and the printer unit 74.

The facsimile unit 72 receives commands input by the user through the operation panel 14, and in accordance with the received commands, sets an operation mode, reads original documents, encodes transmission data, transmits and receives facsimile data, encodes received facsimile data to bitmap data, and transmits bitmap data to the printer unit 74. The facsimile unit 72 includes a facsimile unit CPU (central processing unit) 80, facsimile unit ROM (read-only memory) 82, facsimile unit RAM (random access memory) 84, an NCU (network control unit) 86 which enables transmission of the facsimile data between the facsimile device 2 connected by telephone another facsimile device, and a MODEM (modulator/demodulator) 88 for transmitting/receiving facsimile data through the NCU 86. The facsimile unit CPU 80, facsimile unit ROM 82, facsimile unit RAM 84, the NCU 86, the MODEM 88, the scanner unit 22, and the operation panel 14 are connected with each other through a facsimile unit bus 89. The gate array 76 is also connected to the facsimile unit bus 89. The NCU 86 is connected with the handset 12 and a speaker or buzzer (not shown) for making a ringer tone and confirming handshaking. An ordinary telephone call can be made with use of the handset 12.

The printer unit 74 controls the image forming unit 26 to form images on the recording sheet in accordance with the facsimile data transmitted from the facsimile unit 72 through the gate array 76, and in accordance with printing data received from the personal computer through a personal computer interface 96 via an interface cable 96a.

The printer unit 74 includes a well known microcomputer provided with a printer unit bus 99 connecting a printer unit CPU 90, printer unit ROM 92, printer unit RAM 94, the personal computer interface 96, and the image forming unit 26. The gate array 76 is also connected to the printer unit bus 99.

The personal computer interface 96 is, for example, a Centronics-type parallel interface, and receives print data from the personal computer 98. When print data is transmitted through the interface cable 96a from the personal computer 98 to the interface 96, the printer unit CPU 90 controls the image forming unit 26 to form an image on the recording sheet 24 in accordance with the received print data.

Furthermore, the printer unit 74 functions as an intermediate device between the personal computer 98 and the facsimile unit 72. That is, when a function list data request command, function setting data request command or function setting data are received from the personal computer 98, the command or data is forwarded to the facsimile unit 72 through the gate array 76. Similarly, the function list data and function setting data is input from the facsimile unit 72 and received through the gate array 76 is forwarded to the personal computer 98 through the personal computer interface 96.

An accumulator buffer 94a is set in the printer unit RAM 94 to temporarily accumulate print data transmitted from the personal computer 98 during facsimile printing (by a print data printing process, shown in FIG. 6), and further to temporarily save the communication contents between the facsimile unit 72 and the personal computer 98 while the printing unit 74 functions as an intermediate device. A recording buffer 94b temporarily saves print data corresponding to at least a page length.

The personal computer 98 connected to the printing unit 74 of the facsimile device 2 is a computing device comprising a computer CPU 102, computer ROM 104, RAM 106, a floppy disk drive (FDD) 110, a hard disk drive (HD) 112, a keyboard 114, an input/output (I/O) interface, a mouse 117, and a bus 118. The I/O interface 116 is connected to the personal computer interface 96 of the printer unit 74, and the personal computer 98 is able to exchange data to and from the facsimile device 2 through the I/O interface 116. The HD 112 is a non-volatile memory of the personal computer 98, and the RAM 104 is a processing memory of the personal computer 98.

In FIGS. 4 through 12, "REQ. CMD" is used as an abbreviation for "request command", "REC'D" is used as an abbreviation for "received", and "TX" is used as an abbreviation for "trasimit".

Figure 4:
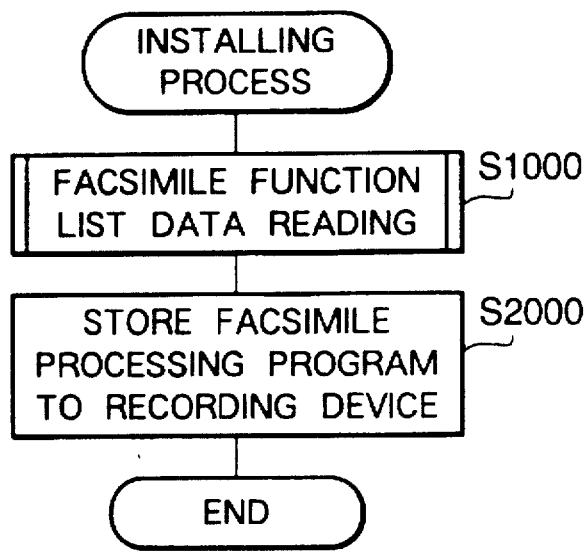
FIG. 4 is a flow chart describing a routine for installing a facsimile processing program in a computing device.

FIG. 4 shows a routine for installing a facsimile processing program into the personal computer 98. This installation routine is, for example, stored as an executable installation program on a floppy disk holding a facsimile processing program to be installed. The installation routine is loaded and executed when the facsimile processing program is to be installed onto the hard disk 112 of the personal computer 98. While the operating system (OS) of the personal computer 98 is running, the user inserts a floppy disk containing the installation program and the facsimile processing program into the FDD 110 of the computer, and executes the installation program via the keyboard 114 or mouse 117. The installation program is loaded to the computer RAM 106 by means of the OS, and is executed.

The installation program retrieves function list data from the connected facsimile machine. Firstly, a facsimile function list data reading routine (described later) is executed at step S1000. Next, the facsimile processing program is transferred from the floppy disk and stored to the memory device (in this case, HD 112) of the personal computer 98 in step S2000.

Figure 5:
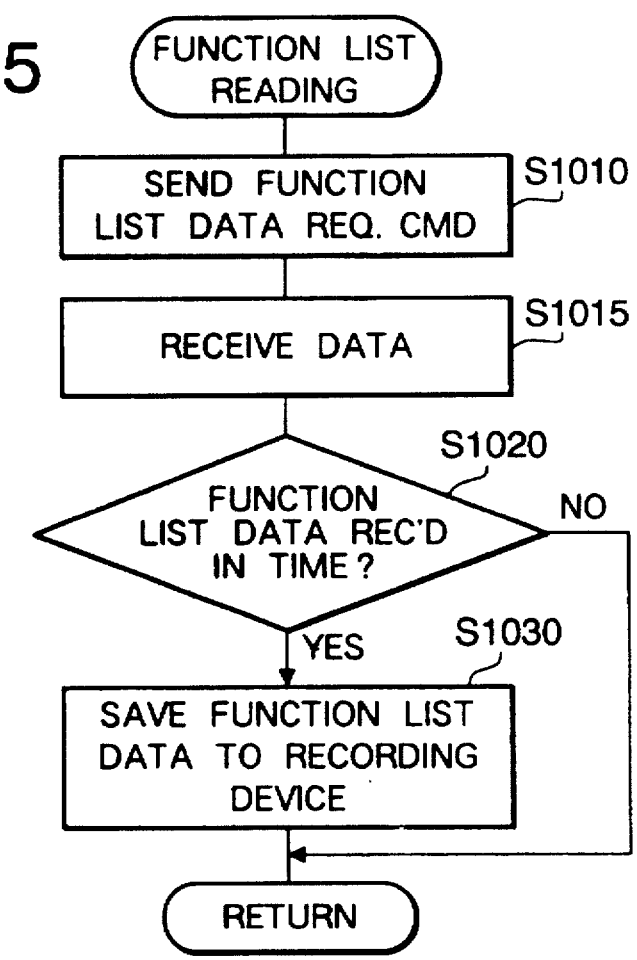
FIG. 5 is a flow chart describing a facsimile function list data reading procedure in the computing device.

The facsimile function list data reading routine called at step S1000 is shown in FIG. 5. At step S1010, a request command for the transmission of function list data is transmitted to the facsimile device 2. The process begins receiving the data at step S1015, and then determines if the function list data requested has been received within a predetermined time (step S1020). If the function list data is received within the predetermined time (Y at step S1020), the received function list data is stored to the HD 112 as a function list file (shown as a FUNCTION LIST FILE in FIG. 3) at step S1030, and then returns. The function list file includes the list of functions and the possible function setting data retrieved from the facsimile device 2, and is used to build a menu display in a facsimile setting process (described later). If the function list data is not received within the predetermined time at step S1020, the facsimile function list data reading routine returns to the calling process.

Accordingly, the function list and/or corresponding settings are received at the computing device when the facsimile processing program is first installed, and even when the user executes the facsimile processing program for the first time, the list and settings can be quickly recalled from the non-volatile memory device without issuing a request command to the facsimile device.

Figure 6:
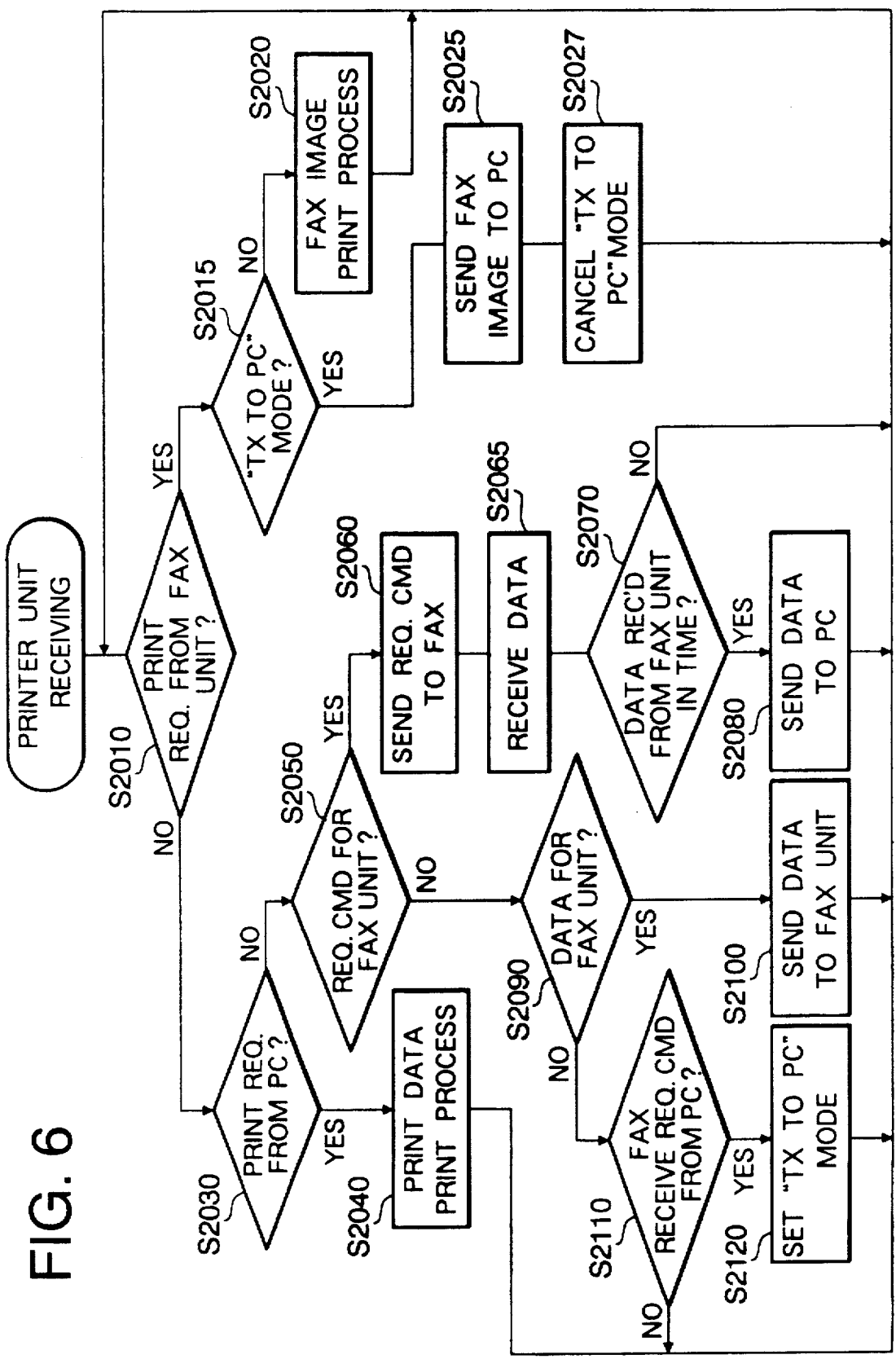
FIG. 6 is a flow chart describing a printer unit data receiving process in the facsimile device.

The printer unit receiving process is shown in FIG. 6. That is, this process determines how the printer unit 74 handles received data based on the data content. At the printer unit 74 of the facsimile device 2, if there is a print request from the facsimile unit 72 (Y at step S2010), the process checks if a "transmit to PC mode" (in which the facsimile format image data is transmitted on to the personal computer 98 without printing) is inactive (N at step S2015). If the "transmit to PC mode" (shown as "TX TO PC" in FIG. 6) is inactive, then the facsimile format image data transmitted from the facsimile unit 74 is received and printed onto the recording sheet 24 at the recording portion 26 at step S2020, and the printer unit receiving process is then restarted.

When the "transmit to PC mode" is active (Y at step S2015), facsimile format image data received from the facsimile unit 72 is transmitted to the personal computer 98 without printing at step S2025, the "transmit to PC mode" is cancelled at step S2027, and the printer unit receiving process is then restarted.

If there is no print request from the facsimile unit 72 (N at step S2010), the process checks for a print request from the personal computer 98 at step S2030, and prints the print data from the personal computer 98 (step S2040) if such a request exists. The printer unit receiving process is then restarted. If there is no print request from the personal computer 98 (N at step S2030), the process checks if a request command is received from the personal computer 98 at step S2050.

The request command may be a function list data request command or a function setting request command. If a request command from the personal computer 98 exists (Y at step S2050), the request command is transmitted on to the facsimile unit 72 through the gate array 76 at step S2060. The process then begins to receive the requested data from the facsimile unit 72 at step S2065, and then checks if the requested data is received from the facsimile unit 72 within a predetermined time at step S2070. If the requested data is received from the facsimile unit 72 within a predetermined time (Y at step S2070), the requested data (function list data or function settings) is transmitted on to the personal computer 98 at step S2080, and the printer unit receiving process is then restarted. If the data is not received from the facsimile unit 72 within the predetermined time (N at step S2070), the printer unit receiving process is restarted.

If a request command from the personal computer does not exist (N at step S2050), the process checks if the data received is to be directed to the facsimile unit 72 at step S2090, i.e., facsimile image data or function setting data from the personal computer 98. If the data is to be transmitted on to the facsimile unit 72 (Y at step S2090), the facsimile image data or function setting data is transmitted on to the facsimile unit through the gate array 76 at step S2100. If the data received is not to be transmitted on to the facsimile unit 72 (N at step S2090), the process checks if the received data is a request command for the printer unit 74 itself from the personal computer 98 (to receive a facsimile format image data) at step S2110. If the received data is a facsimile format image data request command for the printer unit 74 (Y at step 2110), the "transmit to PC mode" is activated in the printer unit 74 at step S2120, and the printer unit receiving process is then restarted. If the received data is not a facsimile format image data request command (N at step S2110), the printer unit receiving process is restarted.

As previously noted, when the "transmit to PC mode", is active, facsimile format image data received from the facsimile unit 72 is transmitted to the personal computer 98 without printing (steps S2015, S2025, S2027).

As previously noted, following execution of steps S2020, S2027, S2040, S2080, S2100, S2120, or in a negative result in steps S2070 and S2110, the printer unit receiving process is restarted by returning to step S2010.

Figure 7:
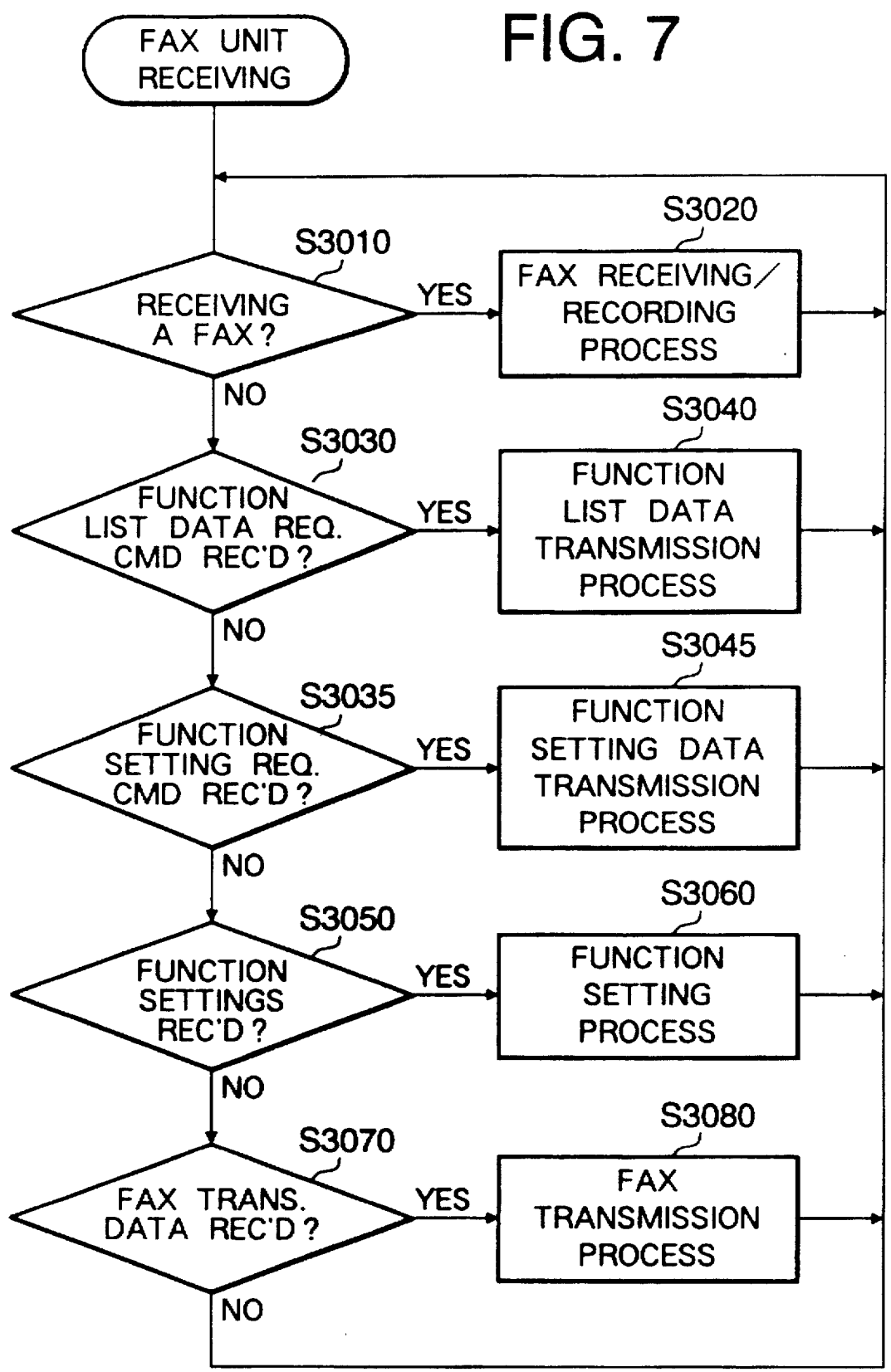
FIG. 7 is a flow chart describing a facsimile unit data receiving process in the facsimile device.

A facsimile unit receiving process is shown in FIG. 7. That is, this process determines how the facsimile unit 72 handles received data based on the data content. At the facsimile unit 72 side, if the facsimile unit 72 is called by the telephone line, the facsimile unit receiving process checks if facsimile format image data is received at step S3010.

If the received data is facsimile format image data (Y at step S3010), a facsimile receiving and recording process at step S3020 is performed, wherein received and recorded facsimile format image data is transmitted to the printer unit 74 to be printed. If the received data is not facsimile format image data (N at step S3010), the process checks if the received data is a request command for function list data at step S3030.

If a request command for function list data is received (Y at step S3030), the data representing the functions and possible function settings of the facsimile device 2, held by the facsimile unit 72 itself, is transmitted as function list data to the printer unit 74 at step S3040. The printer unit 74, having received the transmission of function list data, transmits the function list data to the personal computer 98 as previously described (step S2080 in FIG. 6). Accordingly, the personal computer 98 stores the function list data (in this case, to the HD 112) as previously described (stop S1030 in FIG. 5) in the facsimile function list data reading process. If the received data is not a request command for function list data (N at step S3030), then the process checks if the data is a request command for function settings to be sent to the personal computer 98 at step S3035.

If a request command for function settings is received (Y at step S3035), the current function settings of the facsimile device 2, held by the facsimile unit 72 itself, are transmitted to the printer unit 74 at step S3045. The printer unit 74, having received the transmission of function settings, transmits the function settings to the personal computer 98 as previously described (step S2080 in FIG. 6). Accordingly, the personal computer 98 stores the function settings (described later as step S6080 of FIG. 11, in this case, to the HD 112). If the received data is not a request command for function settings (N at step S3035), then the process checks if the received data is function setting data received from the personal computer 98 at step S3050.

Consequently, the facsimile device is able to distinguish between request commands and other types of received data, and to respond according to the type of received data. Furthermore, the facsimile device is able to recognize a request command for function list data and/or corresponding function settings.

If the received data is function setting data (Y at step S3050) from the personal computer 98, the function settings of the facsimile unit 72 are replaced with the new data at step S3060 in a function setting data process. If the received data is not function setting data (N at step S3060), the process checks at step 3070 if the received data is facsimile format image data transmitted from the personal computer 98 via the printer unit 74. The facsimile format image data from the personal computer 98 includes image data, a telephone number to which the image data is transmitted, facsimile header information, and the like.

Thus, the facsimile device is then able to recognize and respond to received function settings and to respond by adjusting the resident settings.

If the received data is facsimile format image data transmitted from the personal computer 98 (Y at step S3070), the image data content in the facsimile format image data is transmitted to the telephone number included in the facsimile format image data at the facsimile transmitting process of step S3080. If the received data is not facsimile format image data (N at step S3070), the process restarts by returning to step S3010.

Figure 8:
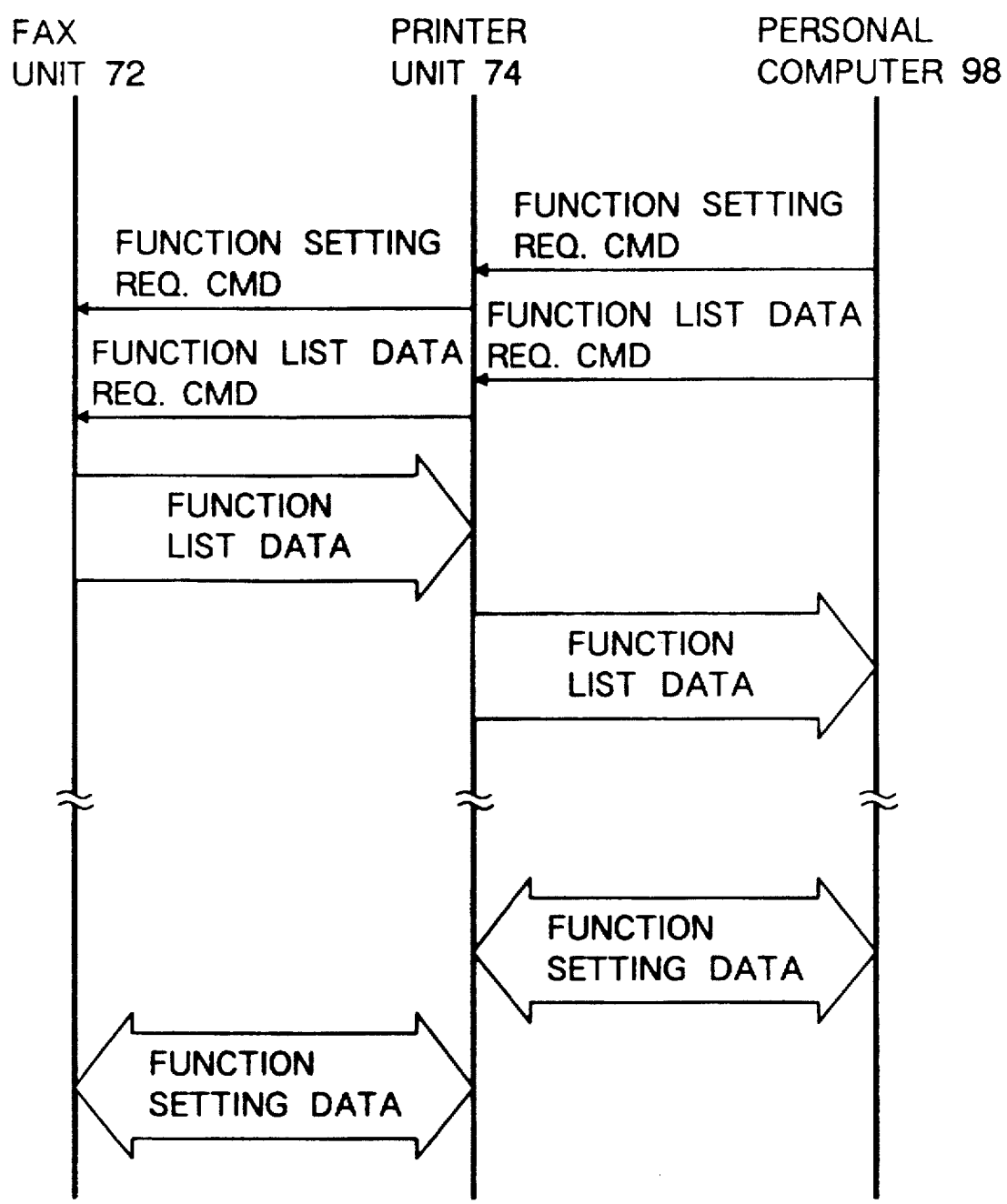
FIG. 8 is a sequence chart showing communication among the personal computer, a printer unit, and a facsimile unit.

The communication conditions among the personal computer 98, the printer unit 74, and the facsimile unit 72 is shown in FIG. 8 as a sequence chart. As shown in FIG. 8, function setting request commands and function list data request commands are sent from the personal computer 98 to the fax unit 72, relayed by the printer unit 74. Function list data is sent to the personal computer 98 from the fax unit 72, again relayed by the printer unit 74. Lastly, function settings can be sent in either direction between the fax unit 72 a the personal computer 98, relayed by the printer unit 74.

Figure 9:
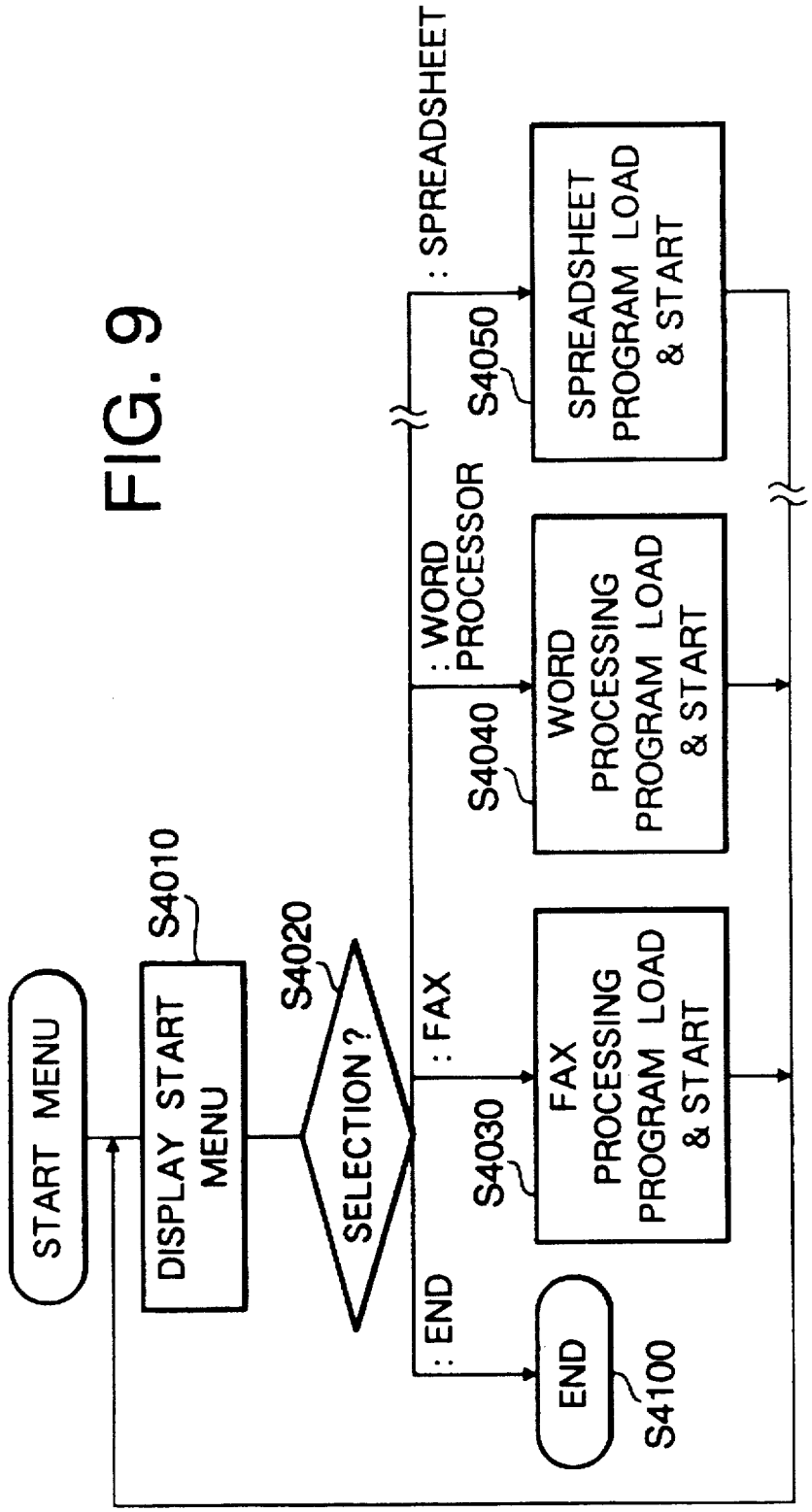
FIG. 9 is a flow chart describing a start menu process in the computing device.

FIG. 9 shows an example of an interface program, integral or linked to the operating system, for selecting various programs installed in the personal computer 98. In this case, a "start" menu process of the personal computer 98 is used. FIG. 9 shows an example of how the facsimile processing program is initiated, when a user of the personal computer selects facsimile processing at step S4030 in FIG. 9.

When the "start" menu program of FIG. 9 is executed, a menu is displayed in the display 108 of the personal computer at step S4010. The menu is used for selecting which one of various programs Is to be executed. The menu has various selections available, and the selection decision is shown by a decision symbol at step S4020 in the flow chart, with the possible selections shown with a colon prefix. This decision symbol is used in the accompanying drawings to represent a decision having multiple branches.

In the menu displayed at step S4010, for example, the facsimile processing program, a word processing program, and a spreadsheet program are available, and the names of that programs are displayed in the menu. When the user selects a desired program by use of the keyboard 114 or mouse 117 at step S4020, the selected program is loaded to the computer RAM 106 from the HD 112 and executed. When the facsimile processing program is selected (:FAX) at step S4020, the facsimile processing program (described later) is loaded and executed at step S4030. Similarly, the word processing program and spreadsheet program may be selected (:WORD PROCESSOR and :SPREADSHEET, respectively) at step S4020, and are loaded and executed, when selected, at steps S4040 and S4050, respectively. The discontinuous line in the flowchart between steps S4040 and S4050 indicates that other selections can be available at step S4020, initiating the loading and execution of other programs. Alternatively, the start menu program may be terminated (:END) at step S4100.

When the facsimile processing program is selected and executed at steps S4020 and S4030, the personal computer 98 functions as a computing device for setting the functions of the facsimile device 2 by communicating with the facsimile unit 72, both of the computing device and facsimile device being part of the overall facsimile system.

Figure 10:
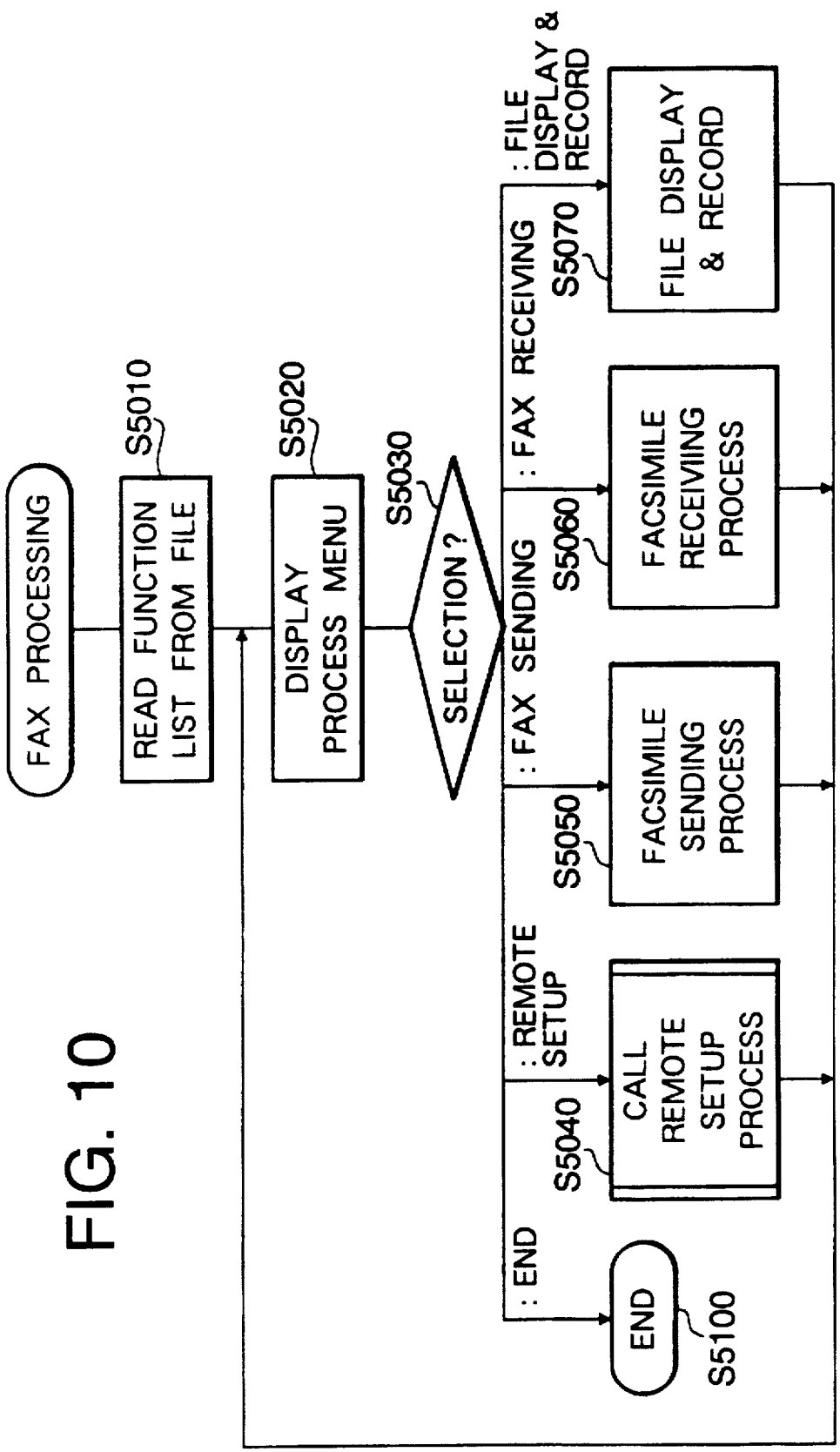
FIG. 10 is a flow chart describing a fax processing program in the computing device.

The facsimile processing routine of the facsimile processing program (installed on the HD 112 at step S2000 of FIG. 4 and executed at step S4030 of FIG. 9) appears in FIG. 10. At step S5010, the function list data of the facsimile device 2, retrieved from the facsimile unit 72 and stored on the HD 112 in step S1030 of FIG. 5 as previously described, are read into the working area of the computer RAM 106. A facsimile processing menu is displayed on the display 108 of the personal computer 98.

In this manner, the function list and/or function settings are requested and received when the user executes facsimile processing, maintaining current values and keeping only the appropriate functions and settings.

When the user selects a desired process by use of the keyboard 114 or mouse 117 at step S5030, the selected process is executed. When a remote setup process is selected (:REMOTE SETUP) at step S5030, the remote setup process (described later) is executed at step S5040.

When the facsimile sending process is selected (:FAX SENDING) at step S5030, facsimile format image data containing image data is transmitted from the personal computer 98 to the facsimile device 2, and the image data is transmitted as a facsimile transmission to another facsimile device by the facsimile device 2. That is, at step S5050, by transmitting facsimile format image data including image data stored on the HD 112 to the printer unit 74, the printer unit receiving process of FIG. 6 recognizes the data as intended for the facsimile unit 72 at step S2090 as previously described, and the facsimile format image data, including image data, is transmitted on to the facsimile unit 72 at step S2100. At the facsimile unit 72, the facsimile unit receiving process of FIG. 7 recognizes the facsimile format image data at step S3070 as previously described, and sends the image data as a facsimile transmission to the telephone number destination at step S3080.

When the facsimile receiving process is selected (:FAX RECEIVING) at step S5030, facsimile data is received as image data from the facsimile device 2 and is stored to the HD 112. That is, by transmitting the facsimile image data request command to the printer unit 74 at step S5060, the printer receiving process of FIG. 6 recognizes the command at step S2110, and the "transmit to PC mode" is set at step S2120. Accordingly, when a print request is subsequently transmitted by the facsimile unit 72 and recognized by the printer receiving process at step S2010, the "transmit to PC mode" is then recognized at step S2015, and the facsimile image data received by the printer unit 74 is transmitted on to the personal computer 98 at step S2025. At the personal computer 98, in step S5060, the facsimile image data received from the printer unit 74 is stored, for example, as a file on the HD 112.

When file display and recording is selected (:FILE DISPLAY & RECORD) at step S5030, the facsimile image data stored on the HD 112 in the above-described facsimile receiving process of step S5060 is displayed on the LCD 108, or it is transmitted on to the facsimile device 2 to be printed.

When termination (:END) is selected, the facsimile processing program is terminated.

Figure 11:
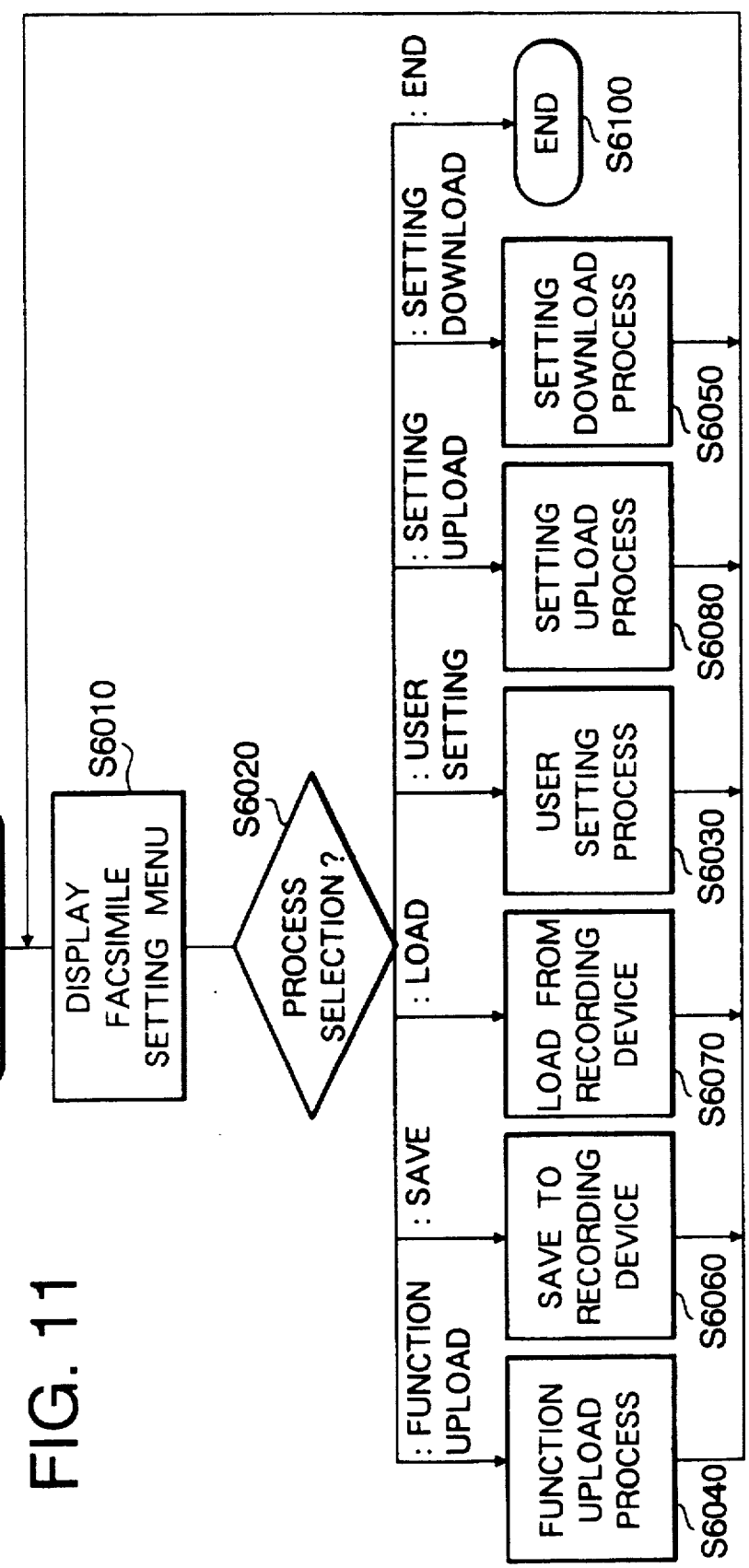
FIG. 11 is a flow chart describing a remote setup process in the computing device.

FIG. 11 shows a remote setup process as called at step S5040 of FIG. 10. As this routine is executed, the function list data (including the various possible settings for each function) for the facsimile device 2 retrieved from the facsimile unit 72 has already been loaded into the working area of the computer RAM 196 at step S5010 of FIG. 10. At step S6010, a facsimile setting menu built from the function list data, including the various possible settings for each function, is displayed on the LCD 108. Two examples of displayed menus are shown in rigs. 12A and 12B.

Figure 12A:
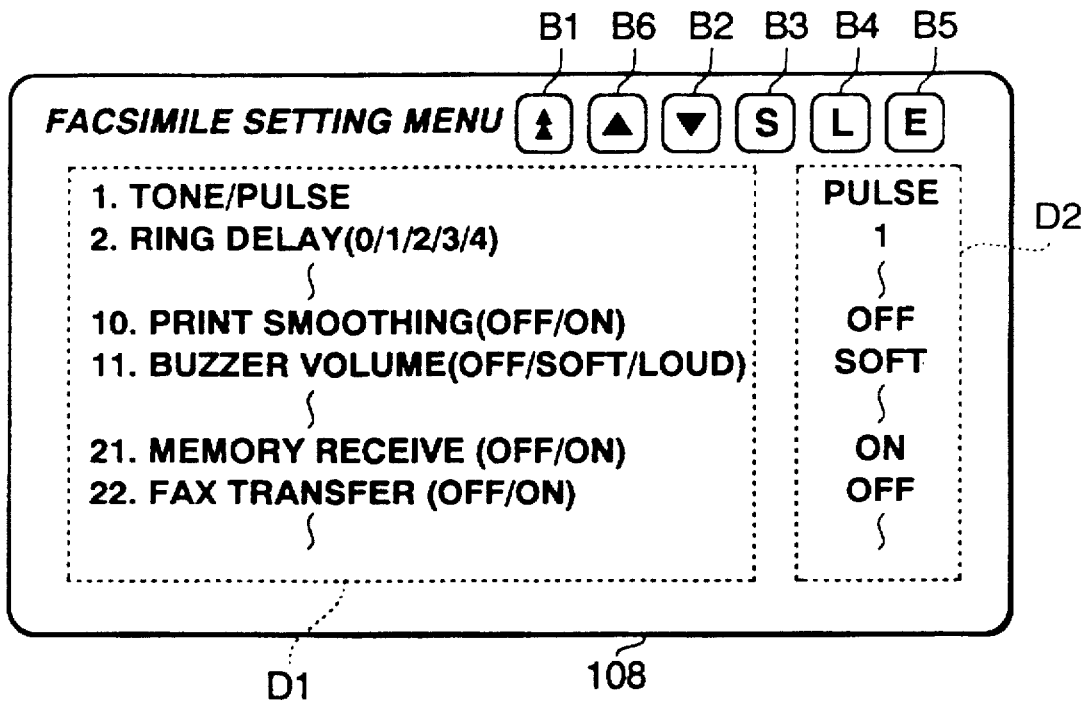
FIGS. 12A and 12B are schematic views of a menu appearing on a display of the computing device.

As shown in FIGS. 12A end 12B, function text area D1 and setting text area D2 are built based upon the function list data retrieved from the facsimile unit 72. Function text area D1 displays a list of function names and possible setting levels for each function. Setting text area D2 displays the retrieved setting condition of the facsimile device 2. When the function setting data conditions are retrieved from the facsimile unit 72, the function setting data conditions of the facsimile device 2 retrieved from the facsimile unit 72 are displayed in the setting text area D2.

When the user selects a desired process by use of the keyboard 114 or mouse 117 at step S6020, the selected process is executed.

In this manner, the computing device, having no information about the connected facsimile device, can query the facsimile device and receive a list of functions and possible function settings (and/or current function settings) from the facsimile device, whereupon a user operating the computing device can select a setting from the possible function settings of a particular function or functions, and remotely set the functions of the facsimile device from the computing device. Since the computing device is able to receive function list data describing any functions and settings, the computing device can control any connected facsimile machine able to send function list data.

If the user setting process is selected (:USER SETTING) at step S6020, a user setting process is executed at step S6030, and the desired function setting level is selected, temporarily stored in the computer RAM 106, and displayed on the LCD 108. For example, the mouse 117 is used to control a cursor on the LCD display 106, and the cursor is moved to one of the possible setting levels of the displayed menu of FIGS. 12A and 12B, whereupon a button on the mouse 117 is pushed. For example, the "Buzzer Volume" function item in FIG. 12A can be changed by moving the cursor to the "Loud" setting level in function text area D1, and the corresponding setting item in the setting text area is changed from "Soft" (as shown) to "Loud".

Figure 12B:
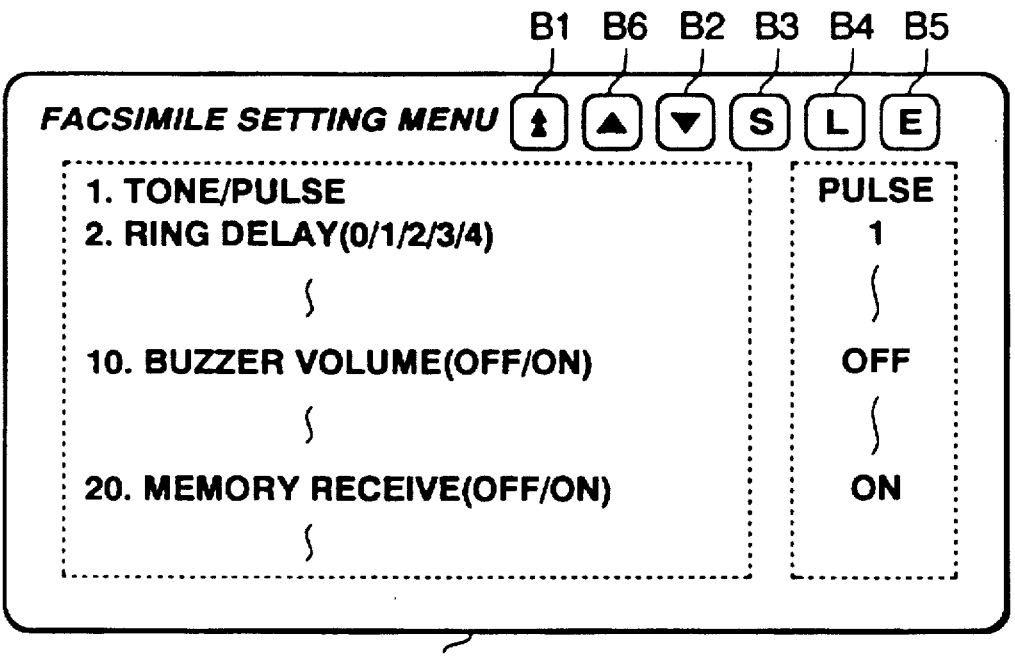

The desired settings can be surely selected from only the functions executable by the facsimile device 2. That is, for example, if the facsimile device 2 lacks the functions of "Smoothing Recording" and "Facsimile Transfer" shown in FIG. 12A, these items are not contained in the function list data file and are therefore not displayed. A possible display in this case is shown in FIG. 12B. Accordingly, the user cannot set a function unavailable to the facsimile device 2, and therefore, confusion caused by the display and selection of a meaningless item is prevented, and efficient setting becomes possible. Furthermore, only the available setting levels of the available functions are displayed or selectable.

When a function upload process is selected (:FUNCTION UPLOAD) at step S6020, a function upload process is executed at step S6040. The function upload process is selected by, for example, using the mouse 117 to move the cursor to a button icon B1 shown in FIG. 12A, and pressing the mouse button. The function upload process carries out the same processing similar to that called by step S1000 of FIG. 4 in the personal computer 98, the printer unit 74, and the facsimile unit 72. That is, the personal computer sends a function list data request command to the printer unit 74, which is recognized at step S2050 of FIG. 6 and passed on to the facsimile unit 72 at step 2060. The facsimile unit 72 recognizes the function list data request command at step S3030 of FIG. 7, and transmits the function list data to the printer unit 74 at step S3040. The printer unit 74 receives the data within the predetermined time at steps S2065 and S2070 of FIG. 6, and sends the data to the personal computer 98, whereupon the function list data are received by the personal computer 98. Accordingly, the function list file on the HD 112 is updated according to the current function list data of the current facsimile device 2. Furthermore, the function list in the working area of the computer RAM 106 and displayed on the LCD 108 is updated according to the retrieved function list data. This processing is useful in case the facsimile device 2 is unplugged, reset, or changed after the facsimile processing program is installed. In this manner, the user can easily adjust the function settings of the facsimile device at the computing device. Furthermore, the function list and setting data can be stored, edited, and recalled locally, enabling rapid and convenient remote adjustment of the function settings of the facsimile device.

When a setting download process is selected (:SAVE) at step S6020, a process to download the current function setting data of the user setting process from the personal computer 98 to the facsimile unit 72 of the facsimile device 2 is executed at step S6050. The setting download process is selected by, for example, using the mouse 117 to move the cursor to a button icon B2 shown in FIG. 12A, and pressing the mouse button. In the setting download process, the function setting levels as set in the user setting process of step S6030 (as shown FIGS. 12A or 12B) are transmitted to the facsimile device 2, as shown in FIG. 8 by FUNCTION SETTING DATA. The printer unit receiving process of FIG. 6 recognizes the function setting data at step S2090, and sends the function setting data on to the facsimile unit 72 at step S2100. The facsimile unit receiving process of FIG. 7 recognizes the function setting data at step S3050, and sets the function settings accordingly at step S3060. Thus, the level of the function settings as set on the display 108 of the personal computer 98 by the user can be immediately reflected at the facsimile unit 72, and the setting operation is effective. Furthermore, the function settings in the setting text area D2 of the display 108 faithfully indicate the function settings of the facsimile unit 72 of the connected facsimile device 2. The settings of adjustable functions can be changed without confusion, and mistaken settings are prevented.

When a save to recording device process is selected (:SAVE) at step S6020, a process to save the function settings displayed in the facsimile setting menu to the recording device (in this case, as a function setting file to the HD 112, shown by FUNCTION SETTING FILE in FIG. 3) is executed at step S6060. The process to save the function settings displayed in the facsimile setting menu to the recording device is selected by, for example, using the mouse 117 to move the cursor to a button icon B3 shown in FIGS. 12A and 12B, and pressing the mouse button. The function setting data set by the user on the display is stored to the HD 112 as a function setting file.

When a load from recording device process is selected (:LOAD) at step S6020, a process to load a previously saved function setting file from the recording device (in this case, a data file previously saved to the HD 112 as in step S6060) is executed at step S6070. The process to load the saved function setting file from the recording device is selected by, for example, using the mouse 117 to move the cursor to a button icon B4 shown in FIG. 12A, and pressing the mouse button. The function setting data are read into the working area of the computer RAM 106 from the function setting file previously saved to the HD 112, and are displayed on the LCD 108 as shown in FIGS. 12A and 12B. Accordingly, the previously recorded setting data can be retrieved.

Accordingly, the function settings themselves can be stored, edited, and recalled without requesting the function list from the facsimile device, without changing the function settings in the facsimile device until the user is satisfied with the settings, and without storing or recalling the function list from the non-volatile memory. This enables efficient setting of the function settings, and furthermore, allows the user to save different function setting data sets for different situations (as various function setting files) to be easily recalled and sent to the facsimile device.

When a setting upload process is selected (:SETTING UPLOAD) at step S6020, a process to upload current function setting data of the facsimile unit 72 of the facsimile device 2 to the working area of the computer RAM 106 is executed at step S6080 The process to upload the current function setting data of the facsimile device 2 is selected by, for example, using the mouse 117 to move the cursor to a button icon B6 shown in FIG. 12A and 12B, and pressing the mouse button. The current function setting data of the facsimile device 2, maintained by the facsimile unit 72, are transmitted to the personal computer 98 and are displayed as shown in FIGS. 12A and 12B. That is, the personal computer sends a function setting request command to the printer unit 74, which is recognized at step S2050 of FIG. 6 and passed on at step 2060. The facsimile unit 72 recognizes the function setting request command at step S3035 of FIG. 7, and transmits the function setting data to the printer unit 74 at step S3045. The printer unit 74 receives the data within the predetermined time at steps S2065 and s2070 of FIG. 6, and sends the data to the personal computer 98, whereupon the function settings are received by the personal computer 98, and the function setting file on the HD 112 is updated according to the current setting data of the current facsimile device 2. Furthermore, the function settings in the working area of the computer RAM 106 and displayed on the LCD 108 are updated according to the retrieved setting data. The function settings are then displayed as shown in FIGS. 12A and 12B.

In this manner, the function settings themselves can be requested and updated without requesting the function list from the facsimile device, without changing the function settings in the facsimile device, and without storing or recalling the function list from the non-volatile memory. This enables efficient setting of the function settings, and furthermore, allows the user to easily update the current status of the facsimile device function settings.

When termination of the remote setup process is selected (:END) at step S6020, the remote setup process ends at step S6100 and returns to the facsimile processing program of FIG. 10. Termination is selected by, for example, using the mouse 117 to move the cursor to a button icon B5 shown in FIGS. 12A and 12B, and pressing the mouse button.

After execution of steps S6030 through S6080, the remote setup process restarts by returning to step S6010.

As described, according to the first embodiment, at the time of installation processing of the facsimile processing program, as shown in FIG. 4, the functions of the facsimile unit 72 are read as function list data into the personal computer 98. At the time of setting of the functions of the facsimile unit 72, by using the retrieved function list data, the items of the facsimile setting menu are displayed, so that the user can effectively set the functions of the facsimile device 2 without confusion. Thus, even when the facsimile device 2 is replaced with a new or different device, if the facsimile device 2 is able to transmit function list data in response to a function list data request from the personal computer 98, the existing program in the computer RAM 106 can be utilized without changing the facsimile processing program.

In the first embodiment, in conjunction with the personal computer 98 components, step S6010 corresponds to a display means, step S6030 corresponds to an input means, step S6050 corresponds to a selected function setting transmission means, step S1010 corresponds to a request command transmitting means, and step S1030 and step S5010 correspond to a means for storing a list of adjustable functions and corresponding function settings to a non-volatile memory. Furthermore, in conjunction with the facsimile device 2 components, steps S3030 and S2050 correspond to a received transmission checking means, and steps S3040 and S2080 correspond to a list transmitting means.

In a modification of this first embodiment, a look-up function list file of numerous facsimile function lists is included in the facsimile processing program and is loaded into the personal computer 98 and stored to the HD 112 at the beginning of the installation process. Each facsimile function list is representative of a facsimile device available on the market. A difference from the first embodiment is that in this case, the function list file is retrieved from the installation floppy, and contains other function list data than that representative of the connected facsimile device 2. In this modification of the first embodiment, every time "function list data" is requested from the facsimile unit 72 (for example, steps S1010 and S6040), and sent by the facsimile unit 72 (for example, step S3040), the "function list data" includes list identifier data representative of the connected facsimile device 2, rather than the actual function list, and the list identifier data is stored to the HD 112 and is used to identify the facsimile function list-corresponding to the connected facsimile device 2 from the look-up function list file on the HD 112.

Figure 13:
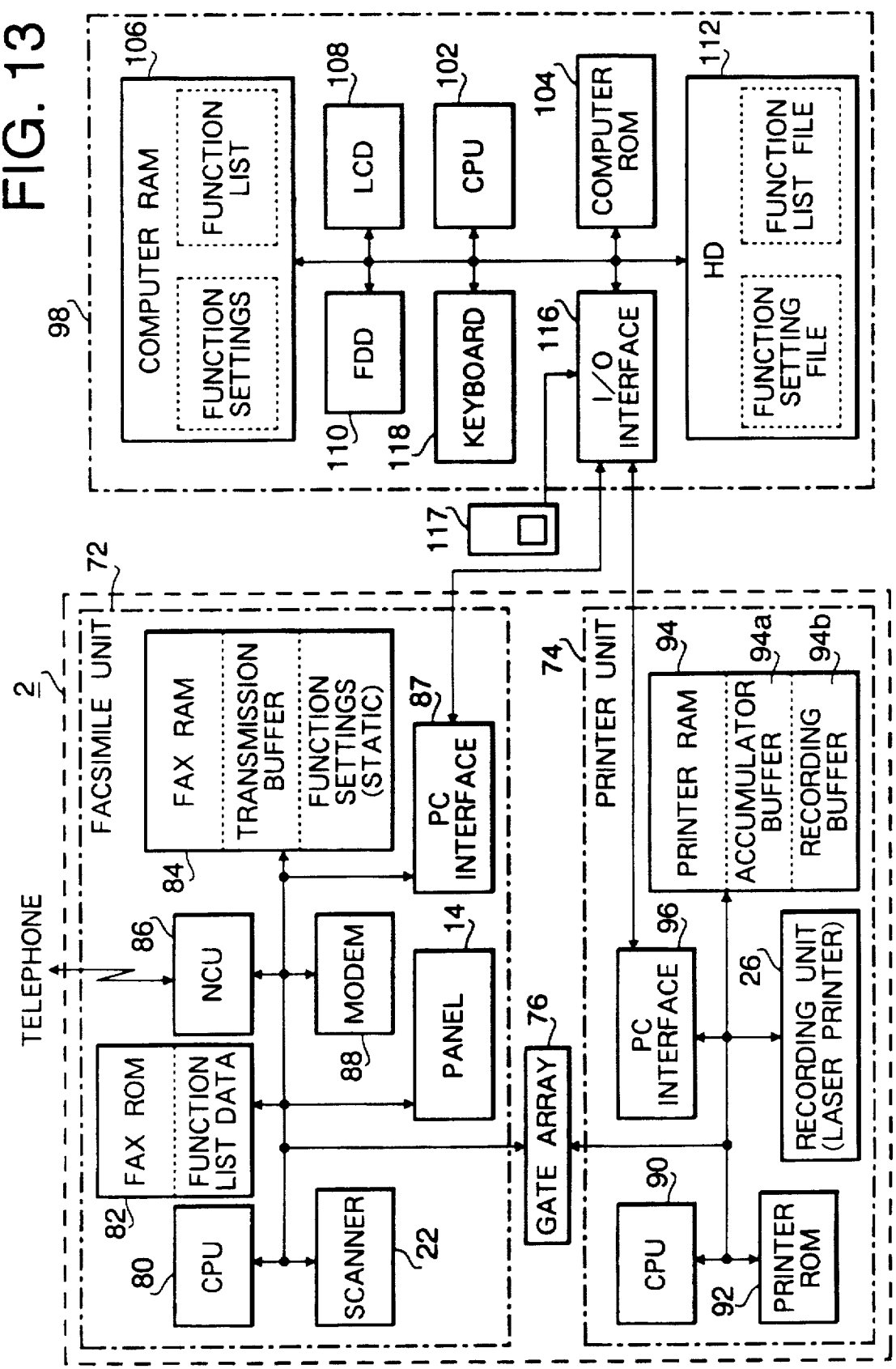
FIG. 13 is a block diagram showing the control and interface systems of a first embodiment of a facsimile system according to the present invention.

A second embodiment of the invention is shown in FIG. 13. In the first embodiment, communication between the personal computer 98 and the facsimile unit 72 with respect to commands and data is performed via the printer unit 74. The second embodiment of the invention is similar to the first, excepting that commands and data are exchanged directly between the personal computer 98 and the facsimile unit 72.

As illustrated in FIG. 13, by providing a personal computer interface 87 (such as an RS-232C interface) to the facsimile unit 72, the transmission of function list data request commands and selected function setting data to the facsimile unit 72 and the receiving of function list data and function setting data from the facsimile unit 72 can be carried out through the personal computer interface 87.

Accordingly, in addition to the advantages of the first embodiment, the processing burden of the printer unit 74 is decreased.

In both embodiments, a facsimile device 2 having printing functions is employed. However, a facsimile-only device can be employed without departing from the spirit and scope of the invention. In this case, facsimile-only device includes an interface identical to the previously described personal computer interface 87, but no function exists to print data from a personal computer 98.

In both embodiments, the facsimile function list data reading process of step S1000 is carried out at the time of installation processing. However, the facsimile function list data reading process at step S1000 can be performed before or after installation. When power to the personal computer 98 is turned on, after the operating system is executed, the facsimile function reading process at step S1000 can be immediately carried out to form a function list data file on the HD 112. That is, the function list data file must exist when the remote setup process of step S5040, but the time of its creation can be changed.

The function reading processing of step S1000 may be carried out, at the latest, just before the reading of the function list data into the computer RAM 106 at step S5010. Furthermore, the reading of the function list data into the computer RAM 106 at step S5010 may be carried out, at the latest, before the facsimile setting menu is first displayed at step S6010. Accordingly, steps S1000 and S5010 may be carried out just before the remote setup process at step S5040. In this case, step S1010 corresponds to a function obtaining command transmission means at the time of loading.

Thus, the setting program for choosing and setting the functions of the facsimile device is installed as a file in the non-volatile memory device (such as a hard disk drive) of a computing device from a portable storage medium such as a floppy disk or CD-ROM, then executed. By means of the installation program itself, a request command is transmitted to the facsimile device to request the function list data of the facsimile device. The facsimile device receives the request command and sends a description of its functions and corresponding possible function setting as function list data to the computing device. The function list data transmitted is saved in non-volatile memory (hard disk) and/or processing memory (RAM). The function list data and settings are displayed as a menu when a facsimile processing program is executed, in order to set the functions of the facsimile device.

Accordingly, the user can identify the functions and function setting options of the facsimile device connected to the computing device, by merely viewing the menu on the display. Furthermore, only the available functions can be viewed or set, preventing mistaken settings. Still furthermore, with only a single setting program, various facsimile devices can be operated, and it is unnecessary to develop different programs for different facsimile devices.

A process may be added for distinguishing between connected facsimile devices. For instance, a function list file and the function list data in processing memory may be compared, and the available and unavailable functions of the facsimile device presently connected may be displayed in different colors, or by position. Alternatively, selection by the cursor of unavailable functions can be disabled.

What is claimed is:

1. A method for controlling a facsimile system, comprising the steps of:

connecting a computing device and a facsimile device, said facsimile device being responsive to received request commands and received function settings;

transmitting a request command from said computing device to said facsimile device to request a list of adjustable functions having corresponding function settings, said list being resident in said facsimile device;

transmitting said list of adjustable functions and corresponding function settings from said facsimile device to said computing device;

selecting a setting of one of said adjustable functions from said corresponding function settings at said computing device;

transmitting said selected function setting of said adjustable function from said computing device to said facsimile device; and adjusting said adjustable function according to said selected function setting at said facsimile device.

2. The method according to claim 1, said computing device comprising a non-volatile memory, and said method further comprising a step of:

executing an installation routine in said computing device to install a facsimile processing program in said non-volatile memory of said computing device, wherein said transmitting a request command is performed in association with said executing of said installation routine.

3. The method according to claim 2, wherein said non-volatile memory comprises a hard disk drive.

4. The method according to claim 1, further comprising a step of:

executing a facsimile processing program for transmitting ad receiving facsimile data to said facsimile device at said computing device, wherein said transmitting a request command in performed in association with said executing a facsimile processing program.

5. The method according to claim 1, checking a received transmission at said facsimile device; and enabling said transmitting said list of adjustable functions and corresponding function settings only when said received transmission includes said request command.

6. The method according to claim 5, enabling said adjusting said adjustable function according to said selected function setting only when said received transmission includes said selected function setting.

7. The method according to claim 1, said computing device comprising a non-volatile memory, a processing memory, a display, and an input device, and said method further comprising steps of:

storing said list of adjustable functions and corresponding function settings to said non-volatile memory;

recalling said list of adjustable functions and corresponding function settings from said non-volatile memory to said processing memory;

displaying said recalled list of said adjustable functions and corresponding function settings at said computing device; and accepting input from said input device, said input determining said selecting of a setting of one of said adjustable functions.

8. The method according to claim 7, further comprising the steps of:

storing said selected function setting of said adjustable function to said non-volatile memory;

recalling said selected function setting of said adjustable function from said non-volatile memory to said processing memory; and displaying said selected function setting of said adjustable function at said computing device.

9. The method according to claim 7, further comprising the steps of;

transmitting a request command from said computing device to said facsimile device to request a new list of function settings corresponding to said list of adjustable functions recalled to said processing memory;

transmitting said new list of function settings from said facsimile device to said computing device; and updating said list of said function settings recalled to said non-volatile memory according to said new list of function settings at said computing device.

10. The method according to claim 7, wherein said displaying said recalled list comprises steps of:

building a menu of adjustable functions and corresponding function settings from said recalled list; and displaying said menu on said display.

11. The method according to claim 1, said facsimile device comprising:

a printer unit for printing images, said printer unit having a printing apparatus and an input/output interface; and a facsimile unit for sending and receiving facsimile image transmissions, said list of adjustable functions having corresponding function settings being resident in said facsimile unit, and said facsimile unit being responsive to received request commands and received function settings; and a gate array connecting said printer unit and said facsimile unit, wherein said computing device is connected to said input/output interface, and all request commands, function settings, and lists of adjustable functions and function settings are transmitted between said computing device and said facsimile unit through said input/output interface, said printer unit, and said gate array.

12. A facsimile system including a computing device and a facsimile device, said facsimile system comprising:

connecting means for connecting said computing device and said facsimile device to exchange transmissions;

list storing means in said facsimile device for storing a list of adjustable functions and corresponding function settings of said facsimile device;

request command transmitting means in said computing device for transmitting a request command to said facsimile device to request said list of adjustable functions and corresponding function settings;

list transmitting means in said facsimile device for transmitting said list of adjustable functions and corresponding function settings to said computing device in response to said request command;

function setting selecting means in said computing device for selecting a function setting of one of said adjustable functions from said corresponding function settings;

selected function setting transmitting means in said computing device for transmitting a selected function setting of said adjustable function to said facsimile device;

function adjusting means in said facsimile device for adjusting an adjustable function of said facsimile device in response to said selected function setting.

13. The facsimile system according to claim 12, further comprising:

a non-volatile memory in said computing device; and installation routine executing means in said computing device for executing an installation routine to install a facsimile processing program in said non-volatile memory of said computing device, wherein said request command is transmitted by said installation routine executing means.

14. The facsimile system according to claim 13, wherein said non-volatile memory comprises a hard disk drive.

15. The facsimile system according to claim 12, further comprising:

facsimile processing program executing means in said computing device for executing a facsimile processing program for transmitting and receiving facsimile data to said facsimile device, wherein said request command is transmitted by said facsimile processing program executing means.

16. The facsimile system according to claim 12, further comprising:

received transmission checking means in said facsimile device for checking included content of a received transmission; and list transmitting enabling means in said facsimile device for enabling said list transmitting means only when said received transmission includes said request command.

17. The facsimile system according to claim 16, further comprising:

function adjusting enabling means in said facsimile device for enabling said function adjusting means only when said received transmission includes said selected function setting.

18. The facsimile system according to claim 12, further comprising:

a non-volatile memory in said computing device;

a processing memory in said computing device;

a display in said computing device;

an input device in said computing device;

means for storing said list of adjustable functions and corresponding function settings to said non-volatile memory;

means for recalling said list of adjustable functions and corresponding function settings from said non-volatile memory to said processing memory;

means for displaying said recalled list of said adjustable functions and corresponding function settings on said display; and means for accepting input from said input device, said input determining said selection of said function setting by said function setting selecting means.

19. The facsimile system according to claim 18, further comprising:

means for storing said selected function setting of said adjustable function to said non-volatile memory;

means for recalling said selected function setting of said adjustable function from said non-volatile memory to said processing memory; and means for displaying said selected function setting of said adjustable function on said display.

20. The facsimile system according to claim 18, further comprising:

function setting request transmitting means in said computing device for transmitting a request command to said facsimile device to request a new list of function settings corresponding to said list of adjustable functions recalled to said processing memory;

new list transmitting means in said facsimile device for transmitting said new list of function settings to said computing device; and list updating means in said computing device for updating said list of said function settings recalled to said non-volatile memory according to said new list of function settings.

21. The facsimile system according to claim 18, said means for displaying said recalled list of said adjustable functions and corresponding function settings comprising:

means for building a menu of adjustable functions and corresponding function settings from said recalled list; and means for displaying said menu on said display.

22. The facsimile system according to claim 12, further comprising:

a printing unit in said facsimile device for printing images;

an input/output interface in said printing unit;

a facsimile unit in said facsimile device for sending and receiving facsimile image transmissions, said list storing means, said list transmitting means, and said function adjusting means being in said facsimile unit; and a gate array connecting said printer unit and said facsimile unit;

wherein said computing device is connected to said input/output interface, and all request commands, function settings, and lists of adjustable functions and function settings are transmitted between said computing device and said facsimile unit through said input/output interface, said printer unit, and said gate array.

23. A facsimile system including a computing device and a facsimile device, said facsimile system comprising:

connecting means for connecting said computing device and said facsimile device to exchange transmissions;

function list storing means in said computing device for storing a plurality of lists of adjustable functions and corresponding function settings;

function list data storing means in said facsimile device for storing function list data representative of one of said plurality of lists;

request command transmitting means in said computing device for transmitting a request command to said facsimile device to request said function list data;

function list data transmitting means in said facsimile device for transmitting said function list data to said computing device in response to said request command;

function setting selecting means in said computing device for selecting a function setting of one of said adjustable functions from said corresponding function settings according to said function list data representative of said one of said lists;

selected function setting transmitting means in said computing device for transmitting a selected function setting of said adjustable function to said facsimile device;

function adjusting means in said facsimile device for adjusting an adjustable function of said facsimile device in response to said selected function setting.

24. The facsimile system according to claim 23, further comprising:

a non-volatile memory in said computing device; and installation routine executing means in said computing device for executing an installation routine to install a facsimile processing program in said non-volatile memory of said computing device, and to store said plurality of lists of adjustable functions and corresponding function settings in said function list storing means.

25. The facsimile system according to claim 24, wherein said request command is transmitted by said installation routine executing means.

26. The facsimile system according to claim 24, further comprising:

a processing memory in said computing device;

a display in said computing device;

an input device in said computing device;

means for storing said function list data to said function list data storing means;

means for recalling one of said plurality of lists of adjustable functions and corresponding function settings from said function list storing means to said processing memory according to said function list data;

means for displaying said recalled list of said adjustable functions and corresponding function settings on said display; and means for accepting input from said input device, said input determining said selection of said function setting by said function setting selecting means.

27. The facsimile system according to claim 26, further comprising:

means for storing said selected function setting of said adjustable function to said non-volatile memory;

means for recalling said selected function setting of said adjustable function from said non-volatile memory to said processing memory; and means for displaying said selected function setting of said adjustable function on said display.

28. The facsimile system according to claim 26, further comprising:

function setting request transmitting means in said computing device for transmitting a request command to said facsimile device to request a new list of function settings corresponding to said list of adjustable functions recalled to said processing memory;

new list transmitting means in said facsimile device for transmitting said new list of function settings to said computing device; and list updating means in said computing device for updating said list of said function settings recalled to said non-volatile memory according to said new list of function settings.

29. The facsimile system according to claim 26, said means for displaying said recalled list of said adjustable functions and corresponding function settings comprising:

means for building a menu of adjustable functions and corresponding function settings from said recalled list; and means for displaying said menu on said display.

30. The facsimile system according to claim 23, further comprising:

facsimile processing program executing means in said computing device for executing a facsimile processing program for transmitting and receiving facsimile data to said facsimile device, wherein said request command is transmitted by said facsimile processing program executing means.

31. The facsimile system according to claim 23, further comprising:

received transmission checking means in said facsimile device for checking included content of a received transmission; and function list data transmitting enabling means in said facsimile device for enabling said function list data transmitting means only when said received transmission includes said request command.

32. The facsimile system according to claim 31, further comprising:

function adjusting enabling means in said facsimile device for enabling said function adjusting means only when said received transmission includes said selected function setting.

33. A facsimile device, comprising:

an input/output interface for receiving and transmitting control data;

list storing means for storing a list of adjustable functions and corresponding function settings of said facsimile device;

request command receiving means for receiving control data representing a request command through said input/output interface;

list transmitting mesas for transmitting said list of adjustable functions and corresponding function settings in response to said control data representing a request command;

selected function setting receiving means for receiving control data representing a selected function setting of said adjustable function through said input/output interface; and function adjusting means for adjusting an adjustable function of said facsimile device in response to said control data representing a selected function setting.

34. A facsimile device controller for controlling a facsimile device, comprising:

an input/output interface for receiving and transmitting control data;

request command transmitting means for transmitting control data representing a request command to request a list of adjustable facsimile device functions and corresponding facsimile device function settings through said input/output interface;

list receiving means for receiving said list of adjustable facsimile device functions and corresponding facsimile device function settings;

function setting selecting means for selecting a function setting of one of said adjustable facsimile device functions from said corresponding facsimile device function settings; and selected function setting transmitting means for transmitting control data representing a selected facsimile device function setting of said adjustable facsimile device function through said input/output interface.

\* \* \* \* \*